United States Patent
Cho et al.

(10) Patent No.: US 10,283,770 B2
(45) Date of Patent: May 7, 2019

(54) COMPOSITE CATHODE ACTIVE MATERIAL, METHOD OF PREPARING THE SAME, AND CATHODE AND LITHIUM BATTERY INCLUDING THE COMPOSITE CATHODE ACTIVE MATERIAL

(71) Applicants: SAMSUNG SDI CO., LTD., Yongin-si, Gyeonggi-do (KR); UNIST (ULSAN NATIONAL INST.OFSCIENCE & TECHNOLOGY), Ulsan (KR)

(72) Inventors: Kwanghwan Cho, Yongin-si (KR); Jaephil Cho, Ulsan (KR); Hyejung Kim, Ulsan (KR)

(73) Assignees: SAMSUNG SDI CO., LTD., Yongin-si, Gyeonggi-do (KR); UNIST (Ulsan National Institute of Science and Technology), Ulsan (KR)

( * ) Notice: Subject to any disclaimer, the term of this patent is extended or adjusted under 35 U.S.C. 154(b) by 508 days.

(21) Appl. No.: 14/972,216

(22) Filed: Dec. 17, 2015

(65) Prior Publication Data

US 2016/0181611 A1   Jun. 23, 2016

(30) Foreign Application Priority Data

Dec. 18, 2014   (KR) .................. 10-2014-0183304

(51) Int. Cl.
*H01M 4/525* (2010.01)
*H01M 4/36* (2006.01)
*C01G 53/00* (2006.01)
*H01M 10/052* (2010.01)

(52) U.S. Cl.
CPC ............ *H01M 4/525* (2013.01); *C01G 53/50* (2013.01); *H01M 4/366* (2013.01); *C01P 2002/50* (2013.01); *C01P 2002/76* (2013.01); *C01P 2002/85* (2013.01); *C01P 2002/88* (2013.01); *C01P 2004/03* (2013.01); *C01P 2004/04* (2013.01); *C01P 2004/61* (2013.01); *C01P 2004/62* (2013.01); *C01P 2004/80* (2013.01); *C01P 2006/40* (2013.01); *H01M 10/052* (2013.01)

(58) Field of Classification Search
CPC .... H01M 4/525; H01M 4/366; H01M 10/052; C01G 53/50; C01P 2002/50; C01P 2004/80; C01P 2006/40
See application file for complete search history.

(56) References Cited

U.S. PATENT DOCUMENTS

| 9,209,455 B2 † | 12/2015 | Ofer |
| 2009/0068561 A1 | 3/2009 | Sun et al. |
| 2013/0149608 A1 | 6/2013 | Kim et al. |

(Continued)

FOREIGN PATENT DOCUMENTS

| KR | 10-2006-0134631 A | 12/2006 |
| KR | 10-2007-0097923 A | 10/2007 |

(Continued)

*Primary Examiner* — Laura Weiner
(74) *Attorney, Agent, or Firm* — Lee & Morse, P.C.

(57) ABSTRACT

A composite cathode active material, including a nickel-based lithium transition metal oxide secondary particle, the nickel-based lithium transition metal oxide secondary particle including a coating layer containing lithium and cobalt on a surface of a primary particle of the secondary particle.

12 Claims, 19 Drawing Sheets

(56) References Cited

U.S. PATENT DOCUMENTS

2014/0045067 A1    2/2014  Cho et al.
2014/0205898 A1    7/2014  Lee et al.

FOREIGN PATENT DOCUMENTS

| KR | 10-2012-0121235 A | 11/2012 |
| KR | 10-2013-0063868 A | 6/2013 |
| KR | 10-2014-0093529 A | 7/2014 |

† cited by third party

COMPOSITE CATHODE ACTIVE MATERIAL, METHOD OF PREPARING THE SAME, AND CATHODE AND LITHIUM BATTERY INCLUDING THE COMPOSITE CATHODE ACTIVE MATERIAL

CROSS-REFERENCE TO RELATED APPLICATION

Korean Patent Application No. 10-2014-0183304, filed on Dec. 18, 2014, in the Korean Intellectual Property Office, and entitled: "Composite Cathode Active Material, Method of Preparing the Same, and Cathode and Lithium Battery Including the Composite Cathode Active Material," is incorporated by reference herein in its entirety.

BACKGROUND

1. Field

One or more exemplary embodiments relate to a composite cathode active material, a method of preparing the same, and a cathode and a lithium battery including the composite cathode active material.

2. Description of the Related Art

To be suitable for use in small and high-performance devices, high energy density may be regarded as an important factor for lithium batteries, in addition to small-size and light-weight characteristics. To be utilized in the field, such as electric vehicles, high capacity and stability of a lithium battery at a high temperature and a high voltage may be important.

SUMMARY

Embodiments may be realized by providing a composite cathode active material, including a nickel-based lithium transition metal oxide secondary particle, the nickel-based lithium transition metal oxide secondary particle including a coating layer containing lithium and cobalt on a surface of a primary particle of the secondary particle.

The coating layer may further include another transition metal.

An amount of cobalt included in the coating layer may be greater than about 0 mol % to about 30 mol % or less based on a total amount of the cobalt and the other transition metal.

A concentration of the cobalt may have a concentration gradient that continuously decreases from the coating layer to a center of the primary particle.

A thickness of the coating layer may be about 20 nm or less.

The coating layer may include i) a product obtained by a sol-gel reaction of a composition including a lithium salt and a cobalt salt, or ii) a nickel-based lithium transition metal oxide and a product obtained by a sol-gel reaction of a composition including a lithium salt and a cobalt salt.

In the coating layer, an amount of i) the product obtained by a sol-gel reaction of a composition including a lithium salt and a cobalt salt, or ii) the nickel-based lithium transition metal oxide and a product obtained by a sol-gel reaction of a composition including a lithium salt and a cobalt salt, may be in a range of about 0.5 parts to about 3 parts by weight based on 100 parts by weight of the composite cathode active material.

The nickel-based lithium transition metal oxide may be a compound represented by Formula 1:

$$Li_aNi_{1-x-y}Co_xM_yO_{2+\alpha}$$  [Formula 1]

wherein, in Formula 1, $0.9 < a < 1.5$, $0 < x < 0.5$, $0 < y < 1$, and $-0.1 \leq \alpha \leq 0.1$; and M is one or more of Mg, Ca, Sr, Ba, Ti, Zr, Nb, Mo, W, Zn, Al, Si, Mn, Cr, Fe, V, or a rare earth element.

The coating layer may include a compound represented by Formula 2:

$$Li_aNi_{1-x-y-z}Co_xM_yMn_zO_2$$  [Formula 2]

wherein, in Formula 2, M is a transition metal; and $0.9 < a < 1.5$, $0 < x \leq 0.3$, $0 \leq y \leq 0.1$, $0 < z \leq 0.3$.

Embodiments may be realized by providing a method of preparing the composite cathode active material, the method including performing a sol-gel reaction of a nickel-based lithium transition metal oxide and a composition including a lithium salt and a cobalt salt; and heat-treating a product of the sol-gel reaction in an oxidizing gas atmosphere at a temperature in a range of about 600° C. to about 900° C.

Embodiments may be realized by providing a cathode, including the composite cathode active material.

Embodiments may be realized by providing a lithium battery, including the cathode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
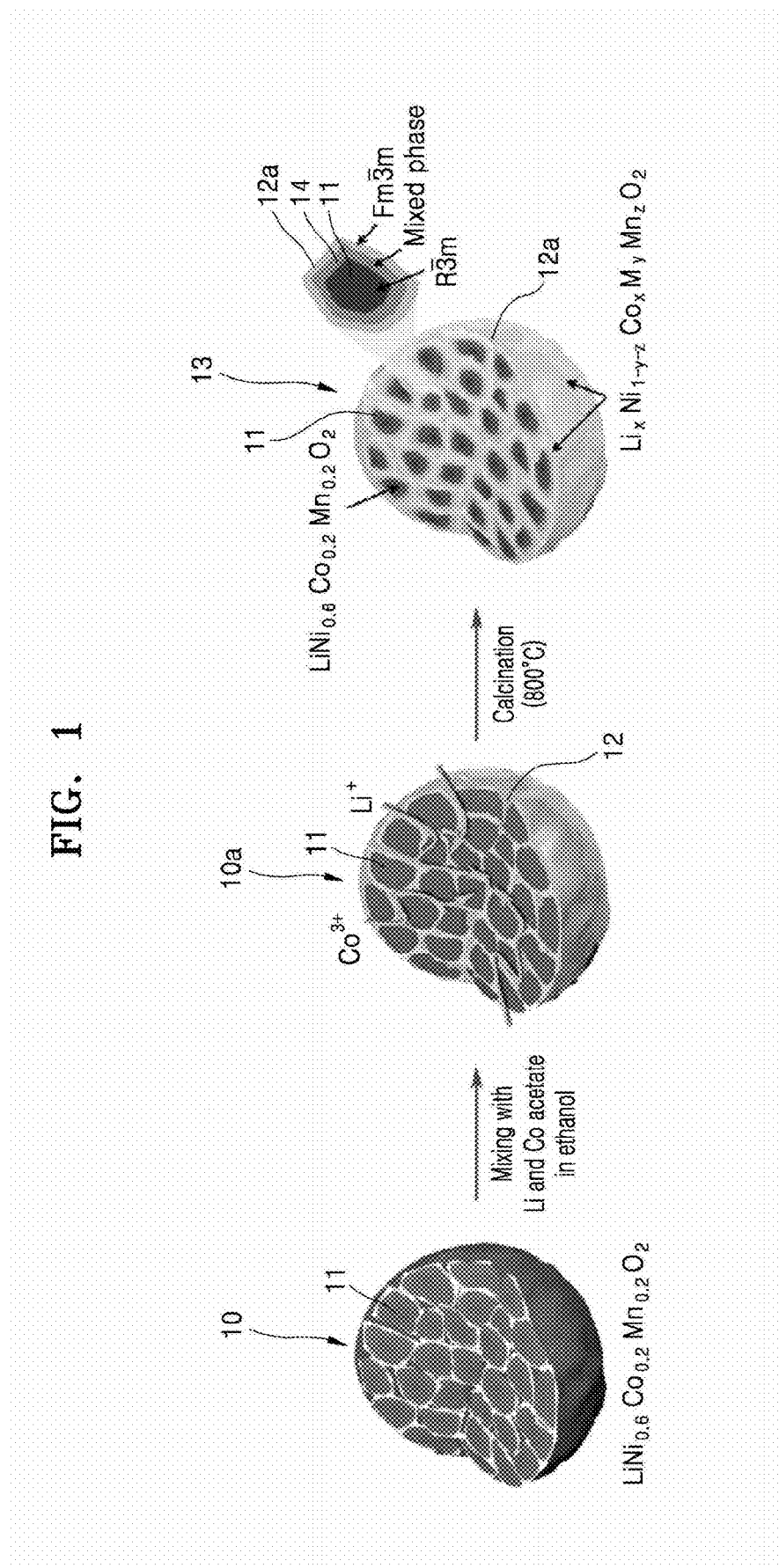
FIG. 1 illustrates a conceptual view of a composite cathode active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a composite cathode active material, a method of preparing the same, and a cathode and a lithium battery including the composite cathode active material according to exemplary embodiments will be described in detail.

According to an embodiment, a composite cathode active material may include secondary particles formed of a nickel-based lithium transition metal oxide; and a coating layer containing cobalt on a surface of primary particles in the secondary particles of the nickel-based lithium transition metal oxide.

As used herein, the primary particles denote one grain or a crystallite. The secondary particle denotes an agglomerate formed when the primary particles are aggregated, and the secondary particles may include pores or boundaries between the primary particles.

The coating layer may be a surface-treatment layer formed by a sol-gel reaction of compositions including a lithium salt and a cobalt salt, and one continuous single coating layer may be formed, and a non-continuous, island-type coating layer may not be formed.

In some embodiments, the coating layer may be a one-body coating layer in which the primary particles are connected to one another without boundaries between the primary particles.

An example of the cathode active material may be a nickel-based lithium transition metal oxide having high energy density characteristics. The nickel-based lithium transition metal oxide may have excellent capacity characteristics and high energy capacity at a high voltage of 4.4 V or greater, but the structural and thermal stability of the oxide may be insufficient, and a material that may be better than the oxide in this regard may be needed. For example, the structural and thermal stability of the cathode active material may deteriorate when the cathode active material is used under conditions of a high temperature and a high voltage, and commercialization of the cathode active material may be difficult.

During the charging/discharging cycles of a lithium battery including the nickel-based lithium transition metal oxide, the lithium battery including the nickel-based lithium transition metal oxide as a cathode active material may have microcracks in the secondary particles, for example due to expansion and contraction of the cathode active material during the charging and discharging of the lithium battery. When the microcracks occur, the electrolyte that penetrates through the cracks may contact the primary particles. When the primary particles contact the electrolyte, a resistance layer, such as a solid electrolyte interphase (SEI) layer, may be formed on a surface of the primary particles, and the electrochemical characteristics of the cathode active material may deteriorate.

The nickel-based lithium transition metal oxide primary particle may be surface-treated, and the composite cathode active material according to an embodiment may have a coating layer containing lithium and cobalt on the nickel-based lithium transition metal oxide primary particle. A volume change of the primary particle occurring when lithium ions are intercalated or deintercalated may be suppressed, for example, due to the surface treatment of the primary particle, a structural deterioration of the primary particle may be prevented, and the generation of microcracks in the secondary particle may be reduced. Therefore, the surface treatment of the primary particle may not only secure the structural stability of both the primary particle and secondary particle, but also may suppress side reactions between the primary particle and the electrolyte, and the thermal characteristics of the composite cathode active material may improve. Accordingly, when the composite cathode active material is used, the lifespan characteristics and high rate charging/discharging characteristics of the lithium battery may improve.

For example, the coating layer may completely cover the primary particle. When the primary particle is completely covered, the stability of the primary particle may additionally improve.

The coating layer may further include a transition metal. Examples of the transition metal may include nickel and manganese.

In the coating layer, the amount of cobalt may be more than 0 mol % and about 30 mol % or less, or, for example, in a range of about 10 mol % to about 30 mol %, or about 20 mol % to about 28 mol % based on the total amount of the transition metal. The total amount of the transition metal includes the amount of cobalt. Cobalt may be structurally stable in various oxidation states, and when cobalt is included in the coating layer at the amount within the ranges above, the stability of the composite cathode active material may improve.

The coating layer may further include nickel and manganese. The amount of manganese in the coating layer may be more than 0 mol % and about 30 mol % or less, or, for example, in a range of about 10 mol % to about 25 mol %, or about 12 mol % to about 20 mol %.

The amount of nickel in the coating layer may be in a range of about 50 mol % to about 65 mol %, or, for example, about 52 mol % to about 60 mol %.

In the composite cathode active material, a concentration of cobalt may have a concentration gradient that continuously decreases from the coating layer to the center of the primary particle. For example, the concentration of cobalt may be the highest at the coating layer and the lowest at the center of the primary particle. The concentration of cobalt in the composite cathode active material may have a concentration gradient since cobalt may diffuse from the coating layer to the center of the primary particle during the formation of the coating layer.

The thickness of the coating layer may be about 20 nm or less, or, for example, in a range of about 1 nm to about 20 nm. When the thickness of the coating layer is within this range, a lithium battery may have excellent capacity and lifespan characteristics without deterioration of discharge capacity. The thickness of the coating layer may be defined by a distance from a surface of the composite cathode active material to a point where the amount of cobalt may be about 10 mol % to about 30 mol % or about 25 mol % to about 30 mol % in a direction toward the center of the core.

The composite cathode active material may have the form of the secondary particle.

The average particle diameter of the primary particle may be in a range of about 200 nm to about 1 µm. When the average particle diameter of the primary particle is within this range, a lithium battery may have excellent stability and high rate characteristics without a decrease in electrode plate mixture density. When the primary particle is not a sphere, the average particle diameter denotes a longitudinal length of the particle.

The primary particle may be a single particle having an average particle diameter, for example, in a range of about 200 nm to about 1 µm. The coating layer may include a product obtained by a sol-gel reaction of a composition including a lithium salt and a cobalt salt. The resultant reaction product may be a cobalt-rich solid solution having a NiO rock-salt phase.

The coating layer may include i) a product obtained by a sol-gel reaction of compositions including a lithium salt and a cobalt salt, or ii) a nickel-based lithium transition metal oxide and a product obtained by a sol-gel reaction of compositions including a lithium salt and a cobalt salt.

In the coating layer, the amount of i) a product obtained by a sol-gel reaction of compositions including a lithium salt and a cobalt salt, or ii) a product obtained by a sol-gel reaction of compositions including a lithium salt and a cobalt salt, may be in a range of about 0.5 parts to about 3 parts by weight based on 100 parts by weight of the total weight of the composite cathode active material.

In the composite cathode active material according to an embodiment, the coating layer formed on a surface of the primary particle may have a structure that does not have a layer distinction or a boundary. A surface phase of the primary particle may be a cation-mixing layer having a rock-salt phase.

The coating layer may cover the primary particle(s) and include an interface layer between the primary particles.

The coating layer may be formed by a sol-gel reaction, and a coating layer that completely covers the primary particle while having a tight state may be obtained, unlike when the coating layer is formed by wet-coating using compositions containing a lithium cobalt oxide or when a lithium cobalt oxide coating layer is formed on a surface of the nickel-based lithium transition metal oxide by mechanically milling the nickel-based lithium transition metal oxide and a lithium cobalt oxide.

As described above, the primary particle may be completely covered with a coating layer in a tight state, and microcracks occurring in the secondary particle, for example, due to expansion and contraction of the cathode active material during charging/discharging of the battery, may be effectively suppressed. When the coating layer is formed on the primary particle, a decrease in charging/discharging efficiency of the battery may be prevented, and the thermal stability and lifespan characteristics of the battery may improve.

The average particle diameter of the secondary particle may be in a range of about 10 µm to about 15 µm.

The composition may further include a transition metal salt. Examples of the transition metal for the salt may be manganese (Mn), molybdenum (Mo), titanium (Ti), platinum (Pt), iridium (Ir), and ruthenium (Ru).

In the coating layer, the amount of the product obtained by a sol-gel reaction of the composition containing a lithium salt and a cobalt salt may be in a range of about 0.5 parts to about 3 parts by weight based on 100 parts by weight of the total weight of the composite cathode active material. The composition may further include a transition metal salt.

The coating layer may be formed by heat-treating the resultant reaction product, e.g., the product of the sol-gel reaction.

The lithium salt and the cobalt salt may be each a nitrate, a sulfate, a chloride, or an acetate, each of which contains lithium and cobalt. The transition metal salt may be a nitrate, a sulfate, a chloride, or an acetate containing a transition metal.

The coating layer may include i) a product obtained by a sol-gel reaction of a composition including a lithium salt or a cobalt salt through a heat treatment, or ii) a nickel-based lithium transition metal oxide and a product obtained by a sol-gel reaction of a composition including a lithium salt and a cobalt salt through a heat treatment. The coating layer may be a layer formed of a solid solution of the resultant reaction product of the nickel-based lithium transition metal oxide included in the primary particle and a product obtained by a sol-gel reaction of the composition including a lithium salt and a cobalt salt. The solid solution may have a NiO rock-salt structure. As used herein, the coating layer may be an interface layer.

FIG. 1 illustrates a conceptual view of the composite cathode active material according to an embodiment.

Referring to FIG. 1, a nickel-based lithium transition metal oxide secondary particle 10 may be an agglomerate of primary particles 11. The nickel-based lithium transition metal oxide secondary particle 10 may be, for example, $LiNi_{0.6}Co_{0.2}Mn_{0.2}O_2$ (NCM622), $LiNi_{0.5}Co_{0.3}Mn_{0.2}O_2$, or $LiNi_{0.5}Co_{0.2}Mn_{0.3}O_2$.

The nickel-based lithium transition metal oxide secondary particle 10 may be mixed with an ethanol solution including a lithium salt, such as lithium acetate, and a cobalt salt, such as cobalt acetate, and the mixture was allowed to react. A coating layer 12 containing lithium and cobalt may be formed on surfaces of the primary particles 11. When a secondary particle 10a having the coating layer 12 is heat-treated, a composite cathode active material secondary particle 13 having a coating layer 12a containing lithium and cobalt formed on surfaces of the primary particles 11 may be obtained. The coating layer 12a may include a compound represented by Formula 2 below:

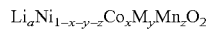  [Formula 2]

In Formula 2, $0.9 < a < 1.5$, M is a transition metal, $0 < x \le 0.3$, $0 \le y \le 0.1$, $0 < z \le 0.3$.

M is a transition metal, and M may be titanium (Ti), zirconium (Zr), iron (Fe), copper (Cu), or strontium (Sr).

In the composite cathode active material, a concentration of cobalt may have a concentration gradient that is continuously decreasing from the coating layer to the center of the primary particle.

A transition metal salt may be added to the ethanol solution including lithium acetate and cobalt acetate.

As shown in FIG. 1, the composite cathode active material may have a structure in which a coating layer 12a contains NCM having a rock-salt layer structure (a space group of Fm3m) on a surface of the primary particle 11 containing the nickel-based lithium transition metal oxide having a layered structure (a space structure of R3m). An intermediate region 14 having a mixed phase may be formed between the primary particle 11 and the coating layer 12a.

The coating layer 12a may have a distinct boundary with the primary particle 11 as illustrated in FIG. 1. In an embodiment, a boundary between the coating layer 12a and the primary particle 11 may not be clearly distinctive. The primary particle 11 and the coating layer 12a may not have clear boundaries, and a concentration of cobalt may have a concentration gradient that continuously decreases from the coating layer 12a to the center of the primary particle 11.

In the composite cathode active material, the nickel-based lithium transition metal oxide may be a compound represented by Formula 1:

$$Li_aNi_{1-x-y}Co_xM_yO_{2+\alpha} \quad \text{<Formula 1>}$$

In Formula 1, $0.9<a<1.5$, $0<x<0.5$, $0<y<1$, and $-0.1 \leq \alpha \leq 0.1$; and M is one or more of Mg, Ca, Sr, Ba, Ti, Zr, Nb, Mo, W, Zn, Al, Si, Mn, Cr, Fe, V, or a rare earth element.

For example, in the composite cathode active material, the nickel-based lithium transition metal oxide may be a compound represented by Formula 2:

$$Li_aNi_{1-x-y}Co_xM_yO_{2+\alpha} \quad \text{<Formula 2>}$$

In Formula 2, $0.9<x<1.1$, $0<x<0.5$, $0<y<0.5$, and $-0.1 \leq \alpha \leq 0.1$; and M is one or more of Mg, Ca, Sr, Ba, Ti, Zr, Nb, Mo, W, Zn, Al, Si, Mn, Cr, Fe, V, or a rare earth element.

For example, in the composite cathode active material, the nickel-based lithium transition metal oxide may be a compound represented by Formula 3:

$$Li_aNi_{1-x-y}Co_xMn_yO_{2+\alpha} \quad \text{<Formula 3>}$$

In Formula 3, $0.9<x<1.1$, $0<x<0.5$, $0<y<0.5$, and $-0.1 \leq \alpha \leq 0.1$.

In Formula 3, 1-x-y may be in a range of greater than 0.4 to lower than 1. For example, 1-x-y may be in a range of about 0.5 to about 0.6. The composite cathode active material, which is nickel-rich, may have a high energy density.

Examples of the nickel-based lithium transition metal oxide according to an embodiment may be $LiNi_{0.6}Co_{0.2}Mn_{0.2}O_2$ (NCM622), $LiNi_{0.5}Co_{0.3}Mn_{0.2}O_2$, and $LiNi_{0.5}Co_{0.2}Mn_{0.3}O_2$.

The coating layer may include a compound represented by Formula 2.

$$Li_aNi_{1-x-y-z}Co_xM_yMn_zO_2 \quad \text{[Formula 2]}$$

In Formula 2, M is a transition metal, $0<x \leq 0.3$, $0 \leq y \leq 0.1$, $0<z \leq 0.3$.

Examples of the compound represented by Formula 2 may be $Li[Ni_{0.55}Co_{0.25}Mn_{0.2}]O_2$, $Li[Ni_{0.5}Co_{0.25}Mn_{0.25}]O_2$, $Li[Ni_{0.65}Co_{0.25}Mn_{0.1}]O_2$, $Li[Ni_{0.5}Co_{0.28}Mn_{0.22}]O_2$, or $Li[Ni_{0.65}Co_{0.2}Mn_{0.15}]O_2$.

Hereinafter, according to an embodiment, a method of preparing a composite cathode active material will be described.

A sol-gel reaction of the nickel-based lithium transition metal oxide and the composition including a lithium salt and a cobalt salt may be performed.

Examples of the lithium salt may include lithium acetate, lithium sulfate, and lithium chloride. Examples of the cobalt salt may include cobalt acetate, cobalt sulfate, and cobalt chloride. The amounts of the lithium salt and the cobalt salt may be stoichiometrically controlled to obtain the compound represented by Formula 2.

Subsequently, the resultant product of the sol-gel reaction may be heat-treated in an oxidizing gas atmosphere at a temperature in a range of about 600° C. to about 900° C.

The nickel-based lithium transition metal oxide may be prepared by using a method used in the art. The method may be, for example, a co-precipitation method.

A precursor mixture may be obtained by mixing a nickel precursor, a cobalt precursor, a metal (M) precursor, and a solvent. Examples of the solvent may include water and an alcohol-based solvent. An example of the alcohol-based solvent may be ethanol. In the metal precursor, M may be one or more of Mg, Ca, Sr, Ba, Ti, Zr, Nb, Mo, W, Zn, Al, Si, Mn, Cr, Fe, V, or a rare earth element.

The nickel precursor, the cobalt precursor, and the metal precursor may be a sulfate, a nitrate, or a chloride, each containing nickel, cobalt, or metal.

A chelating agent and a pH adjusting agent may be added to the precursor mixture for a co-precipitation reaction to obtain a precipitate. The precipitate thus obtained may be filtered and heat-treated. The heat treatment may be performed at a temperature in a range of about 20° C. to about 110° C., for example, at about 80° C. When a temperature of the heat treatment is within this range, the reactivity of the co-precipitation reaction may be excellent.

The chelating agent may control a reaction rate of forming the precipitate. Examples of the chelating agent may include an ammonium hydroxide ($NH_4OH$) and citric acid. Content of the chelating agent may be the same as used in the art.

When a sodium hydroxide is used as the pH adjusting agent (a precipitating agent), a hydroxide containing nickel, cobalt, or metal may be obtained. When a sodium carbonate is used as the pH adjusting agent, a metal carbonate may be obtained. When a sodium oxalate is used as the pH adjusting agent, a metal oxalate may be obtained.

The pH adjusting agent may control a pH of the reaction mixture to be in a range of 6 to 12, and examples of the pH adjusting agent may include an ammonium hydroxide, a sodium hydroxide (NaOH), a sodium carbonate ($Na_2CO_3$), and a sodium oxalate ($Na_2C_2O_4$).

The hydroxide containing nickel, cobalt, or metal may be mixed with a lithium compound, and the mixture may be heat-treated to obtain a nickel-based lithium transition metal oxide in an air or oxygen atmosphere at a temperature in a range of about 400° C. to about 1200° C., or, for example, about 750° C. to about 800° C. A period of time for performing the heat treatment may be, for example, in a range of about 15 hours to about 18 hours.

An average particle diameter of the nickel-based lithium transition metal oxide secondary particle may be in a range of about 10 μm to about 15 μm, and an average particle diameter of the nickel-based lithium transition metal oxide primary particle may be in a range of about 100 nm to about 2 μm.

According to an embodiment, a cathode may include the composite cathode active material.

The cathode may include a current collector; and a cathode active material layer disposed on the current collector.

For example, the cathode may be prepared by molding a cathode active material composition including the composite cathode active material and a binder into a predetermined shape or by coating a cathode active material composition on a current collector such as a copper foil or an aluminum foil.

For example, a cathode active material composition may be prepared by mixing the composite cathode active material, a conducting agent, a binder, and a solvent. A cathode plate may be prepared by directly coating the cathode active material composition on a metal current collector. In an embodiment, the cathode active material composition may be cast on a separate support, and then a film detached from the support may be laminated on a metal current collector to prepare a cathode plate. The cathode may have any shape.

The cathode may include at least one technical feature, such as composition and particle diameter, that is different from the composite cathode active material in addition to the composite cathode active material and may further include a cathode active material used in the art.

Examples of the cathode active material used in the art may include one or more of a lithium cobalt oxide, a lithium nickel cobalt manganese oxide, a lithium nickel cobalt aluminum oxide, a lithium iron phosphate, or a lithium manganese oxide. Any cathode active material used in the art may be further used.

For example, the cathode active material may be a compound that is represented by one of the formulae of $Li_aA_{1-b}B_bD_2$ (where, $0.90 \le a \le 1.8$ and $0 \le b \le 0.5$); $Li_aE_{1-b}B_bO_{2-c}D_c$ (where, $0.90 \le a \le 1.8$, $0 \le b \le 0.5$, and $0 \le c \le 0.05$); $LiE_{2-b}B_bO_{4-c}D_c$ (where, $0 \le b \le 0.5$ and $0 \le c \le 0.05$); $Li_aNi_{1-b-c}Co_bB_cD_\alpha$ (where, $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_\alpha$ (where, $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_\alpha$ (where, $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where, $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (where, $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_\alpha$ (where, $0.90 \le a \le 1.8$, $0 \le b \le 0.5$, $0 \le c \le 0.05$, and $0 < \alpha < 2$); $Li_aNi_bE_cG_dO_2$ (where, $0.90 \le a \le 1.8$, $0 \le b \le 0.9$, $0 \le c \le 0.5$, and $0.001 \le d \le 0.1$); $Li_aNi_bCo_cMn_dGeO_2$ (where, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1.8$ and $0.001 \le b \le 0.1$); $Li_aCoG_bO_2$ (where, $0.90 \le a \le 1.8$ and $0.001 \le b \le 0.1$); $Li_aMnG_bO_2$ (where, $0.90 \le a \le 1.8$ and $0.001 \le b \le 0.1$); $Li_aMn_2G_bO_4$ (where, $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

In the formulae, the letters A, B, D, E, F, G, Q, I, and J represent variables, as further defined. For example, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compound may have a coating layer on a surface thereof, or the compound may be mixed with a compound having a coating layer. The coating layer may include a coating element compound, such as an oxide of a coating element, a hydroxide of a coating element, an oxyhydroxide of a coating element, an oxycarbonate of a coating element, or a hydroxycarbonate of a coating element. A compound forming the coating layer may be amorphous or crystalline. A coating element included in the coating layer may be Mg, Al, Co, K, Na, Ca, Si, Ti, V, Sn, Ge, Ga, B, As, Zr, or a mixture thereof. A coating layer formation process may be performed by using any method and these elements to include the compound, as long as the method (for example, a spray coating method or a dipping method) does not negatively affect the physical properties of a positive electrode active material.

For example, the cathode active material may be $LiNiO_2$, $LiCoO_2$, $LiMn_xO_{2x}$ (where, $x=1$ or 2), $LiNi_{1-x}Mn_xO_2$ (where, $0 < x < 1$), $LiNi_{1-x-y}Co_xMn_yO_2$ (where, $0 \le x \le 0.5$ and $0 \le y \le 0.5$), $LiFeO_2$, $V_2O_5$, TiS, or MoS.

Examples of the conducting agent may include carbon black or graphite particles. Any conducting agent used in the art may be used. For example, the conducting agent may be a conductive material, and examples of the conductive material may include graphite such as natural graphite and artificial graphite; carbon black such as acetylene black, Ketjen black, channel black, furnace black, lamp black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

Examples of the binder may include vinylidene fluoride/hexafluoropropylene copolymers, polyvinylidene fluoride (PVDF), polyacrylonitrile, polymethyl methacrylate, polytetrafluoroethylene, and mixtures thereof, or styrene butadiene rubber based polymers. Any binder used in the art may be used.

Examples of the solvent may include N-methylpyrrolidone, acetone, and water. Any solvent used in the art may be used.

Contents of the composite positive electrode active material, the conducting agent, the binder, and the solvent are as used in the manufacture of a lithium battery. One or more of the conducting agent, the binder, and the solvent may not be used according to the use and the structure of the lithium battery.

According to an embodiment, a lithium battery may include the composite cathode active material. The lithium battery may be manufactured as follows.

First, a cathode may be prepared in the same manner as in the preparation method of the cathode described above.

Next, an anode active material composition may be prepared by mixing an anode active material, a conducting agent, a binder, and a solvent. An anode plate may be prepared by directly coating and drying the anode active material composition on a metal current collector. In an embodiment, the anode active material composition may be cast on a separate support, and then a film detached from the support may be laminated on a metal current collector to prepare an anode plate.

The anode active material may be any anode active material used in the art. However, for example, the anode active material may include one or more of lithium metal, a metal material that is alloyable with lithium, a transition metal oxide, a transition metal sulfide, a material capable of doping and dedoping lithium, a material that is capable of reversibly intercalating and deintercalating lithium ions, or a conductive polymer.

Examples of the transition metal oxide may include a tungsten oxide, a molybdenum oxide, a titanium oxide, a lithium titanium oxide, a vanadium oxide, and a lithium vanadium oxide. The transition metal oxide may be a Group I metal compound, such as CuO, $Cu_2O$, $Ag_2O$, CuS, or $CuSO_4$; a Group IV metal compound, such as $TiS_2$ or SnO;

a Group V metal compound, such as $V_2O_5$, $V_6O_{12}$, $VO_x$ (where, $0<x<6$), $Nb_2O_5$, $Bi_2O_3$, or $Sb_2O_3$; a Group VI metal compound, such as $CrO_3$, $Cr_2O_3$, $MoO_3$, $MoS_2$, $WO_3$, or $SeO_2$; a Group VII metal compound, such as $MnO_2$ or $Mn_2O_3$; a Group VIII metal compound, such as $Fe_2O_3$, FeO, $Fe_3O_4$, $Ni_2O_3$, NiO, $CoO_3$, or CoO; or a lithium titanate that is represented by a formula of $Li_xMN_yX_2$ (where, M and N are each independently a metal selected from Groups I to VIII metals, X is oxygen or sulfur, $0.1 \leq x \leq 2$, and $0 \leq y \leq 1$), and examples of the lithium titanate include $Li_yTiO_2$ (where, $0 \leq y \leq 1$), $Li_{4+y}Ti_5O_{12}$ (where, $0 \leq y \leq 1$), and $Li_{4+y}Ti_{11}O_{20}$ (where $0 \leq y \leq 1$).

Examples of the material capable of doping and dedoping lithium may include Si, $SiO_x$ (where, $0<x<2$), a Si—Y alloy (where, Y is an alkali metal, an alkali earth metal, a Group XIII element, a Group XIV element, a transition metal, a rare earth element, or a combination thereof, except for Si), Sn, $SnO_2$, a Sn—Y alloy (where Y is an alkali metal, an alkali earth metal, a Group XIII element, a Group XIV element, a transition metal, a rare earth element, or a combination thereof, except for Sn), or a mixture of $SiO_2$ and one or more selected therefrom. Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material that is capable of reversibly intercalating and deintercalating lithium ions may be any carbon-based anode active material used in the art in the manufacture of a lithium battery. The carbon-based active material may be crystalline carbon, amorphous carbon, or a mixture thereof. Examples of the crystalline carbon may include graphite such as natural graphite or artificial graphite in amorphous, disk-shaped, flake, spherical, or fibrous form, and examples of the amorphous carbon may include soft carbon (carbon sintered at low temperature), hard carbon, meso-phase pitch carbides, or sintered cokes.

Examples of the conductive polymer may include disulfide, polypyrrole, polyaniline, polyparaphenylene, polyacetylene, and a polyacene-based material.

In the anode active material composition, the conducting agent, the binder, and the solvent may be the same as used in the cathode active material composition. The cathode active material composition and/or the anode active material composition may further include a plasticizer to form pores in the electrode plate.

Amounts of the anode active material, the conducting agent, the binder, and the solvent used herein may be used at levels suitable for a lithium battery. According to a purpose and structure of the lithium battery, one or more of the conducting agent, the binder, and the solvent may be omitted.

A separator that may be interposed between the cathode and the anode may be prepared. The separator may be any one of various separators used in a lithium battery. The separator may have a low resistance to ion flow and a high electrolytic solution-retaining capability. Examples of the separator are glass fibers, polyester, Teflon, polyethylene, polypropylene, polytetrafluoroethylene (PTFE), and a combination thereof. These separators may be a rollable separator formed of, for example, polyethylene or polypropylene. A separator suitable for a lithium ion polymer battery may be a separator that has an excellent organic electrolytic solution-retaining capability. An example of a method of forming the separator will be described in detail.

A polymer resin, a filler, and a solvent may be mixed to prepare a separator composition. The separator composition may be directly coated onto an electrode and dried to form a separator. In an embodiment, the separator composition may be cast onto a support, dried, and then separated from the support as a separator film. Then, the separator film may be laminated onto an electrode, thereby forming a separator.

The polymer resin used in forming the separator may be any one of various materials that are used as a binder of an electrode plate. Examples of the polymer resin include a vinylidene fluoride/hexafluoropropylene copolymer, polyvinylidene fluoride (PVDF), polyacrylonitrile, polymethyl methacrylate, and a mixture thereof.

Then, an electrolyte may be prepared.

For example, the electrolyte may be an organic electrolytic solution. The organic electrolytic solution may be prepared by dissolving a lithium salt in an organic solvent.

The organic solvent may be any one of various organic solvents used in the art. Examples of the organic solvent are propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, and a mixture thereof.

The lithium salt may be any one of various lithium salts used in the art. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, each of x and y is a natural number), LiCl, LiI, and a mixture thereof.

The electrolyte may be a solid electrolyte, such as an organic solid electrolyte or an inorganic solid electrolyte. When a solid electrolyte is used, the solid electrolyte may also function as a separation film.

Examples of an organic solid electrolyte include a polyethylene derivative, a polyethylene oxide derivative, a polypropylene oxide derivative, an ester phosphate polymer, polyester sulfide, polyvinyl alcohol, polyvinylidene sulfide, and a polymer including an ionic dissociation group.

Examples of an inorganic solid electrolyte are a boron oxide and a lithium oxynitride. For example, any one of various materials that are used as a solid electrolyte in the art may be used herein. The solid electrolyte may be formed on an anode by, for example, sputtering. For example, a nitride, a halide, or a sulfate of Li, such as $Li_3N$, LiI, $Li_5NI_2$, $Li_3N$—LiI—LiOH, $LiSiO_4$, $LiSiO_4$.LiI—LiOH, $Li_2SiS_3$, $Li_4SiO_4$, $Li_4SiO_4$.LiI—LiOH, and $Li_3PO_4$.$Li_2S$—$SiS_2$ may be used.

Figure 2:
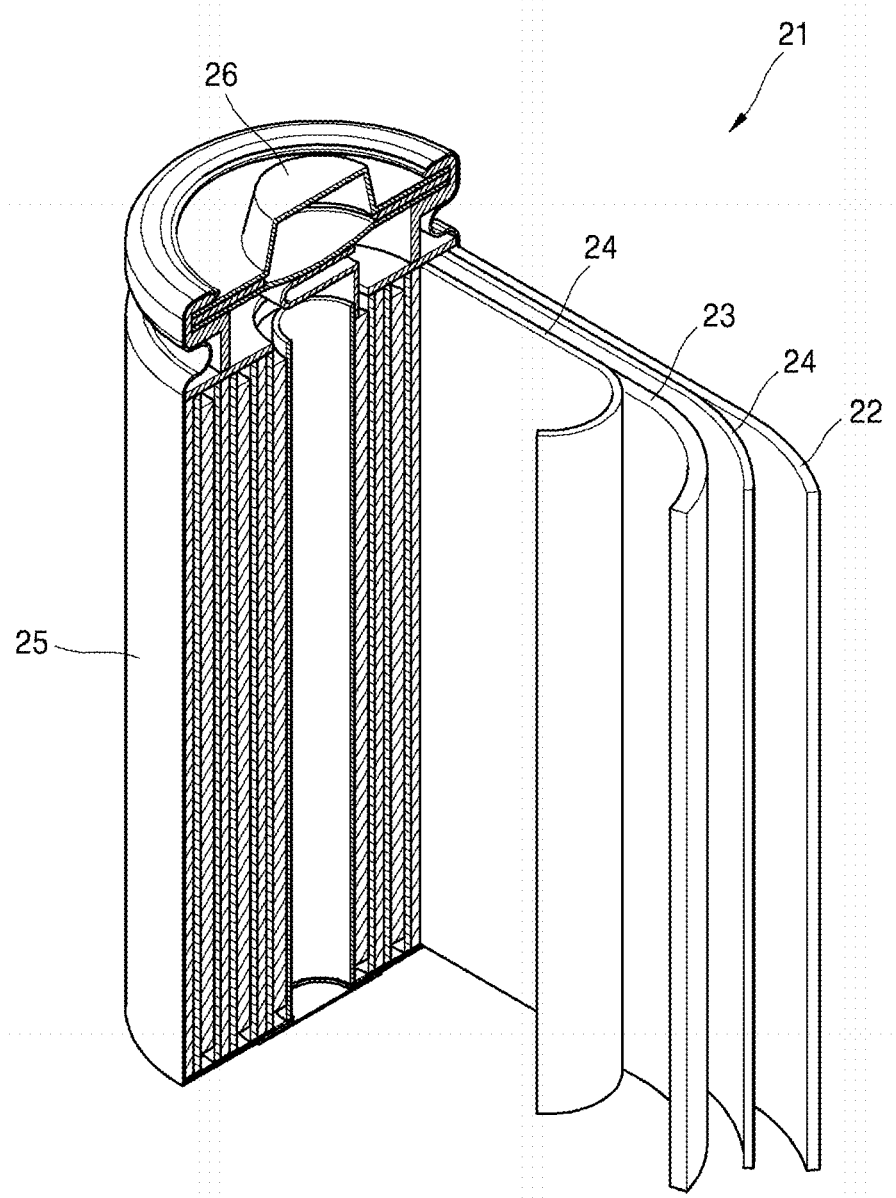
FIG. 2 illustrates a schematic perspective view of a lithium battery according to an embodiment.

Referring to FIG. 2, a lithium battery 21 may include a cathode 23, an anode 22, and a separator 24. The cathode 23, the anode 22, and the separator 24 may be wound or folded to be housed in a battery case 25. Then, an organic electrolytic solution may be injected to the battery case 25, and the resultant structure may be sealed with a cap assembly 26, thereby completely manufacturing the lithium battery 21. The battery case 25 may have, for example, a cylindrical, rectangular, or thin-film form. For example, the lithium battery 21 may be a thin-film type battery. In an embodiment, the lithium battery 21 may be a lithium ion battery.

A battery assembly may be formed by interposing a separator between a cathode and an anode. A plurality of battery assemblies may be stacked in a bi-cell structure, and then impregnated with an organic electrolytic solution. The resultant structure may be housed in a pouch and sealed, thereby completely manufacturing a lithium ion polymer battery.

Battery assemblies may be stacked on each other to form a battery pack connected in series. The battery pack may be used in high-capacitance and high-performance devices, such as a laptop, a smart phone, an electric tool, and an electric vehicle.

The lithium battery may have good high-temperature cyclic characteristics and high-temperature stability, and the lithium battery may be suitable for use in middle and large-sized energy storage devices, such as an electric vehicle. The lithium battery may be suitable for use in a hybrid electric vehicle such as a plug-in hybrid electric vehicle (PHEV).

According to an embodiment, a method of preparing a composite cathode active material may include mixing and reacting a nickel-based lithium transition metal oxide with a composition including a transition metal containing a lithium salt and a cobalt salt; and heat-treating the resultant product of the reaction in an oxidizing gas atmosphere at a temperature in a range of about 600° C. to about 900° C.

When a temperature of the heat-treating is lower than 600° C., a single coating layer may not be formed on a surface of the primary particle, and when a temperature of the heat-treating is higher than 900° C., cobalt may be completely dispersed inside the primary particle, and a concentration of cobalt in the coating layer may not have a concentration gradient that decreases from the coating layer to the center of the primary particle.

For example, a formation process of the coating layer may be performed for about 5 hours to about 10 hours in an oxidizing gas atmosphere at a temperature in a range of about 700° C. to about 800° C. The oxidizing gas atmosphere may denote, for example, an air atmosphere or an oxygen atmosphere.

A temperature of the reaction of the nickel-based lithium transition metal oxide and the composition including a transition metal salt containing a lithium salt and a cobalt salt may be in a range of about 60° C. to about 80° C., and the reaction may be performed according to a process of a sol-gel reaction. The resultant reaction product may be dried at a temperature in a range of about 120° C. to about 160° C. before performing the heat-treating.

During a process of preparing a core coated with nanoparticles, the amount of the nanoparticles of the compound including cobalt attached on the core may be in a range of about 5 wt % to about 30 wt % based on the total weight of the core coated with the nanoparticles. When the amount of the nanoparticles is less than about 5 wt %, a surface of the core may not be completely covered with the coating layer, and when the amount of the nanoparticles is greater than about 30 wt %, a discharge capacity may be excessively decreased.

The nickel-based transition metal oxide may be prepared by preparing a mixture by mixing a precursor of the nickel-based transition metal oxide and a lithium precursor; and heat-treating the mixture in an air atmosphere at a temperature in a range of about 800° C. to about 1000° C. for about 10 hours to about 20 hours.

The precursor of the nickel-based transition metal oxide may be prepared by co-precipitating a nickel precursor and a precursor of another transition metal. For example, the precursor of the nickel-based transition metal oxide may be a hydroxide including nickel and another metal.

The lithium precursor used in the method may be lithium carbonate ($Li_2CO_3$) or lithium hydroxide (LiOH). Any lithium precursor used in the art may be used.

Examples of the cobalt precursor may be cobalt acetate, cobalt sulfate, and cobalt nitrate. Examples of the nickel precursor may be nickel acetate, nickel sulfate, and nickel nitrate.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Preparation of Composite Cathode Active Material

First, a $Li[Ni_{0.6}Co_{0.2}Mn_{0.2}]O_2$ (NCM) secondary particle was prepared as follows.

A nickel precursor, $NiSO_4 \cdot 6H_2O$, a cobalt precursor, $CoSO_4$, and a manganese precursor, $MnSO_4 \cdot H_2O$, were added to water at a molar ratio of about 50:20:30 to prepare a precursor aqueous solution. While stirring, a sodium hydroxide aqueous solution was slowly and dropwisely added to the precursor aqueous solution to neutralize the precursor aqueous solution, and thus $Ni_{0.6}Co_{0.2}Mn_{0.2}(OH)_2$ was precipitated. The precipitate was filtered, washed, and dried at a temperature of 80° C. to prepare a $Ni_{0.6}Co_{0.2}Mn_{0.2}(OH)_2$ powder.

The $Ni_{0.6}Co_{0.2}Mn_{0.2}(OH)_2$ powder and a lithium precursor, LiOH, were prepared at a molar ratio of 1:0.505.

The prepared precursors were mixed, placed into a furnace, underwent calcination at a temperature in a range of about 750° C. to about 900° C. while oxygen flowed therein for about 16 hours to about 17 hours, and thus a $Li[Ni_{0.6}CO_{0.2}Mn_{0.2}]O_2$ secondary particle was obtained. An average particle diameter of the secondary particle was about 12.5 μm.

0.3 g of lithium acetate and 1.6 g of cobalt acetate were added to 15 ml of ethanol and mixed to prepare a transition metal salt-containing solution. Then, 30 g of the $Li[Ni_{0.6}Co_{0.2}Mn_{0.2}]O_2$ (NCM) secondary particle obtained according the description above was added to the transition metal salt-containing solution, and the mixture underwent a sol-gel reaction at a temperature of about 70° C. The resultant product of the sol-gel reaction was vacuum-dried at a temperature of about 150° C., and heat-treated at a temperature of about 800° C., and thus a composite cathode active material having an average particle diameter of about 10 μm was obtained.

The composite cathode active material included a 622 NCM secondary particle, and, the secondary particle had a structure in which a coating layer included a $Li[Ni_{0.55}Co_{0.25}Mn_{0.2}]O_2$ particle that completely covered the primary particle on a surface of the primary particle. A crystalline structure of the $Li[Ni_{0.55}CO_{0.25}Mn_{0.2}]O_2$ particle was a rock-salt layered structure (R3m), and a mixed phase was observed between the primary particle and the coating layer. A crystalline structure of the primary particle was a layered structure (Fm3m). The amount of the $Li[Ni_{0.6}Co_{0.2}Mn_{0.2}]O_2$ (NCM) particle was about 98 parts by weight, and the amount of the $Li[Ni_{0.55}Co_{0.25}Mn_{0.2}]O_2$ particle was about 2 parts by weight.

Example 2

Preparation of Composite Cathode Active Material

A composite cathode active material was prepared in the same manner as in Example 1, except that the amount of the $Li[Ni_{0.6}Co_{0.2}Mn_{0.2}]O_2$ (NCM) particle was about 99.5 parts by weight, and amounts of reactants were changed so that the amount of the coated $Li[Ni_{0.55}CO_{0.25}Mn_{0.2}]O_2$ particle was about 0.5 parts by weight.

Example 3

Preparation of Composite Cathode Active Material

A composite cathode active material was prepared in the same manner as in Example 1, except that the amount of the $Li[Ni_{0.6}Co_{0.2}Mn_{0.2}]O_2$ (NCM) particle was about 97 parts by weight, and amounts of reactants were changed so that the amount of the coated $Li[Ni_{0.55}Co_{0.25}Mn_{0.2}]O_2$ particle was about 3 parts by weight.

Comparative Example 1

NCM622 Secondary Particle

A $Li[Ni_{0.6}Co_{0.2}Mn_{0.2}]O_2$ secondary particle having an average particle diameter of about 12.5 μm was obtained and used as a cathode active material.

Comparative Example 2

Coating Layer Formed on a 622 NCM Secondary Particle 0.3 g of lithium acetate and 1.6 g of cobalt acetate were added to 15 ml of ethanol and mixed to prepare a transition metal salt-containing solution. Then, 30 g of $Li[Ni_{0.6}Co_{0.2}Mn_{0.2}]O_2$ having an average particle diameter obtained according to Comparative Example 1 was added to the transition metal salt-containing solution, and the mixture underwent a sol-gel reaction at a temperature of about 70° C. The resultant product of the sol-gel reaction was vacuum-dried at a temperature of about 150° C., and heat-treated at a temperature of about 800° C., and thus a composite cathode active material was obtained.

The composite cathode active material had a structure in which a coating layer including a $Li[Ni_{0.55}CO_{0.25}Mn_{0.2}]O_2$ particle on the 622 NCM secondary particle was formed.

Manufacture Example 1

Preparation of Cathode and Lithium Battery (Coin Half-Cell)

The composite cathode active material powder synthesized in Example 1 and a carbon conducting material (Super P) were homogeneously mixed at a weight ratio of about 97:1.5, a polyvinylidene fluoride (PVDF) binder solution was added to the mixture to prepare an active material slurry having the active material, the carbon conducting material, and the binder at a weight ratio of 97:1.5:1.5. The slurry was coated on an aluminum current collector having a thickness of about 15 μm at a thickness of about 90 μm by using a doctor blade, dried at a temperature of about 120° C. for 3 hours or more, and then pressed to prepare a cathode plate having a thickness of about 120 μm.

The cathode plate, a lithium metal as a counter electrode, a polyethylene separator (STAR 20, Asahi), and 1.3 M of $LiPF_6$ dissolved in a mixed solvent of ethylene carbonate (EC), ethyl methyl carbonate (EMC), and dimethyl carbonate (DMC) (at a volume ratio of 3:3:4) as an electrolyte were used to prepare a 2016-type coin half-cell.

Manufacture Examples 2 and 3

Preparation of Cathode and Lithium Battery (Coin Half-Cell)

Coin half-cells were prepared in the same manner as in Manufacture Example 1, except that the composite cathode active materials prepared in Examples 2 to 6 were used instead of the composite cathode active material prepared in Example 1.

Comparative Manufacture Examples 1 and 2

Preparation of Cathode and Lithium Battery (Coin Half-Cell)

Coin half-cells were prepared in the same manner as in Manufacture Example 1, except that the composite cathode active materials prepared in Comparative Examples 1 and 2 were used instead of the composite cathode active material prepared in Example 1.

Evaluation Example 1

Scanning Electron Microscopy (SEM) and Energy Dispersive X-Ray Spectroscopy (EDX) Test SEM analysis was performed on an exterior of the composite cathode active material secondary particle prepared in Example 1 and an interior of the secondary particle, and the results are shown in FIGS. 3A, 3B, 4A, and 4B.

Figure 3A:
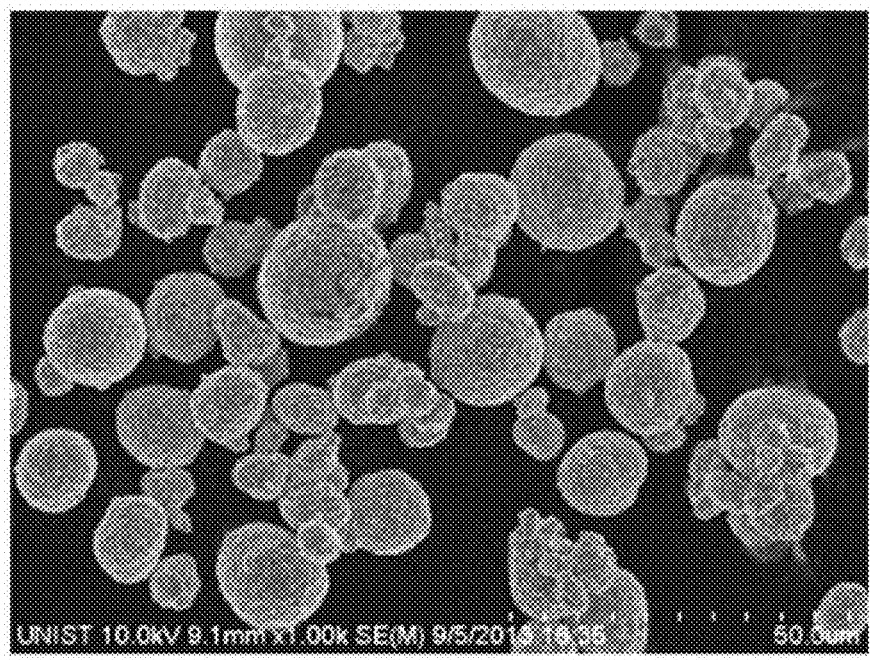
FIG. 3A illustrates an image of electron scanning microscope analysis performed on secondary particles of a composite cathode active material prepared in Example 1.
Figure 3B:
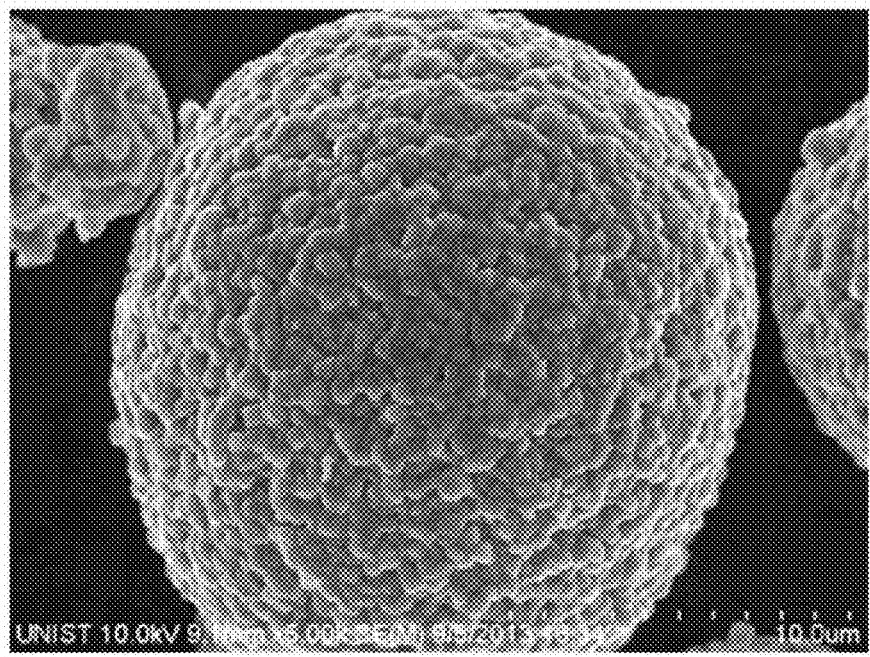
FIG. 3B illustrates a 5-times magnified image of electron scanning microscope analysis performed on the secondary particles of the composite cathode active material prepared in Example 1 of FIG. 3A.
Figure 4A:
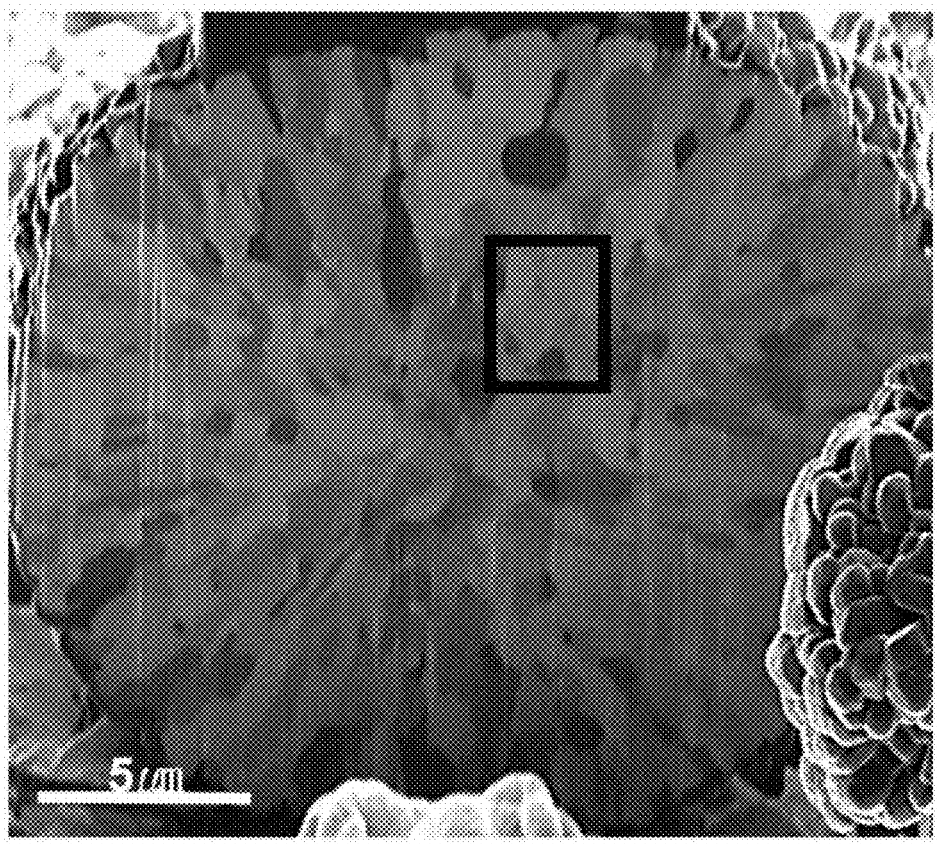
FIG. 4A illustrates an electron scanning microscope image of the inside of the secondary particles of the composite cathode active material prepared in Example 1.
Figure 4B:
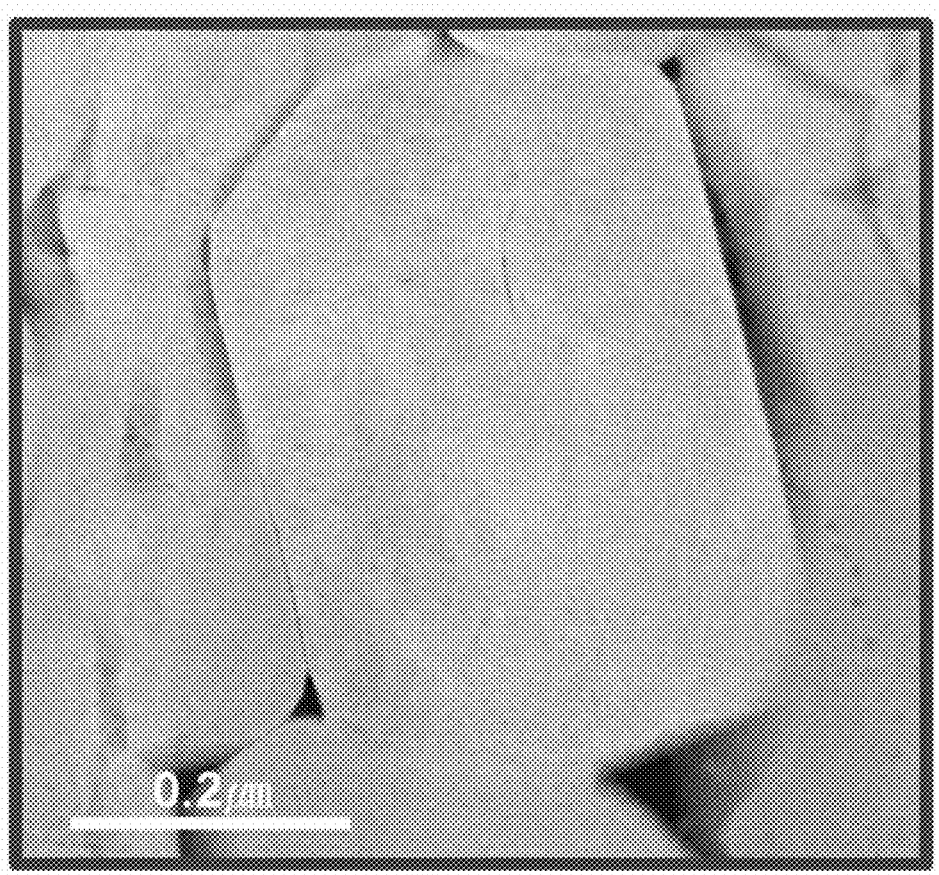
FIG. 4B illustrates an electron scanning microscope image of primary particles inside the secondary particles of the composite cathode active material prepared in Example 1 shown in FIG. 4A.

FIG. 3A illustrates an SEM image of the secondary particle, and FIG. 3B illustrates an SEM image at 5× magnification of the image in FIG. 3A. FIG. 4A illustrates an SEM image of the interior of the secondary particle, and FIG. 4B illustrates an SEM image of a magnified view of the primary particle forming the secondary particle shown in FIG. 4A.

Referring to FIGS. 3A and 3B, the secondary particle may be a spherical particle that may be formed by the aggregated primary particles. Referring to FIGS. 4A and 4B, the primary particles may be tightly packed by considering a cross-sectional and internal view of the secondary particle. An average particle diameter of the secondary particle prepared in Example 1 was in a range of about 10 um to about 15 um, and a size of the primary particle was in a range of about 100 nm to about 2 um.

Figure 4C:
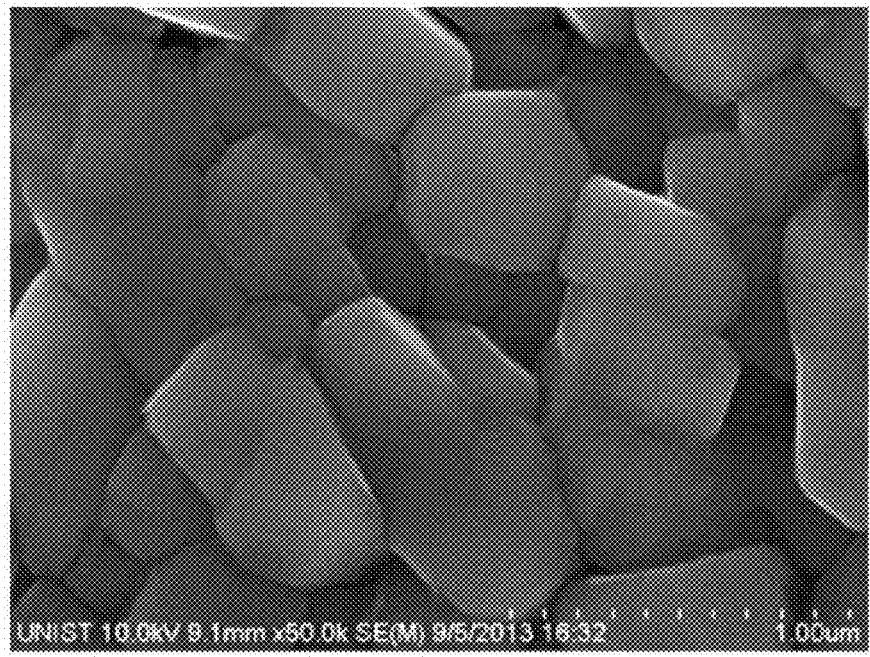
FIGS. 4C and 4D illustrate electron scanning microscope images of the composite cathode active material prepared in Example 1 and an active material obtained according to Comparative Example 1.
Figure 4D:
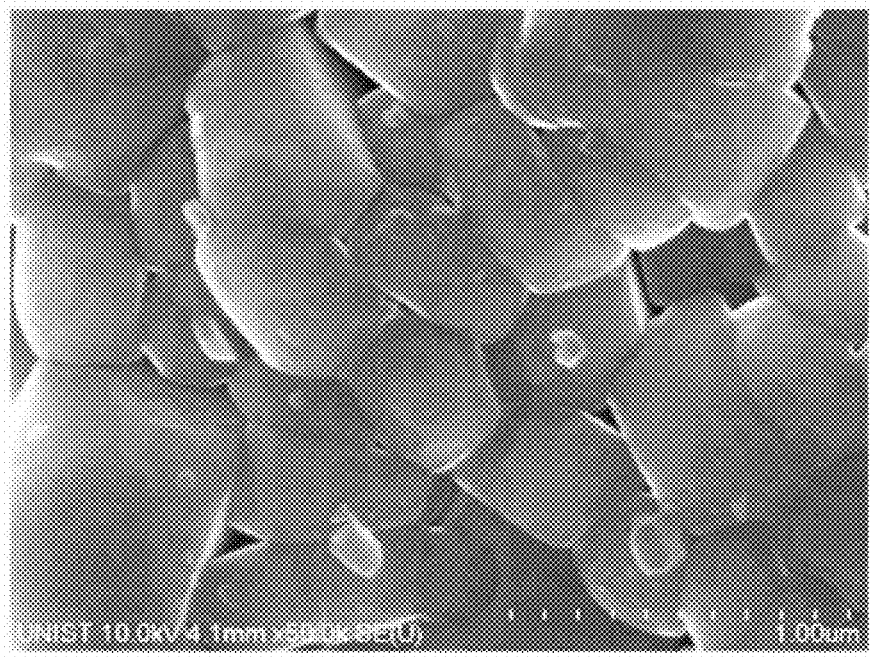

SEM analysis was performed on the composite cathode active material secondary particle prepared in Example 1 and the 622 NCM secondary particle prepared in Comparative Example 1, and the results are shown in FIGS. 4C and 4D.

Referring to FIGS. 4C and 4D, the composite cathode active material secondary particle prepared in Example 1 had a coating layer formed on a surface of the primary particle. The coating layer was not observed in the NCM secondary particle prepared in Comparative Example 1.

Evaluation Example 2

SEM and EDX Test

An EDX test was performed on the composite cathode active material prepared in Example 1 and the NCM prepared in Comparative Example 1 to measure a composition of the transition metal according to a location of the primary particle, and some of the results are shown in FIG. 2. The EDX measuring apparatus was FEI Sirion SEM_EDX.

Figure 5A:
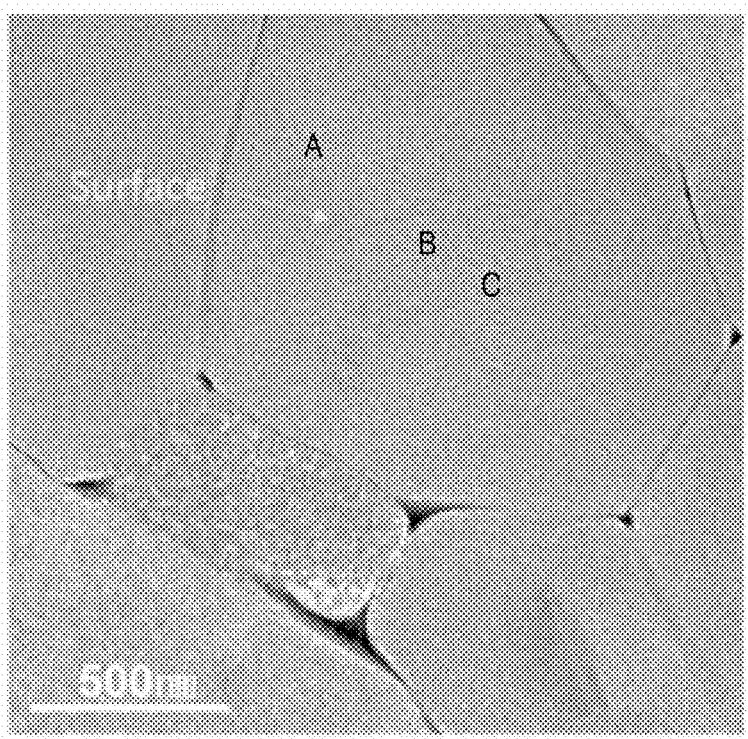
FIGS. 5A and 5B illustrate a Scanning electron microscopy and energy dispersive X-ray spectroscopy (SEM/EDX) analysis image of the composite cathode active material prepared in Example 1.
Figure 5B:
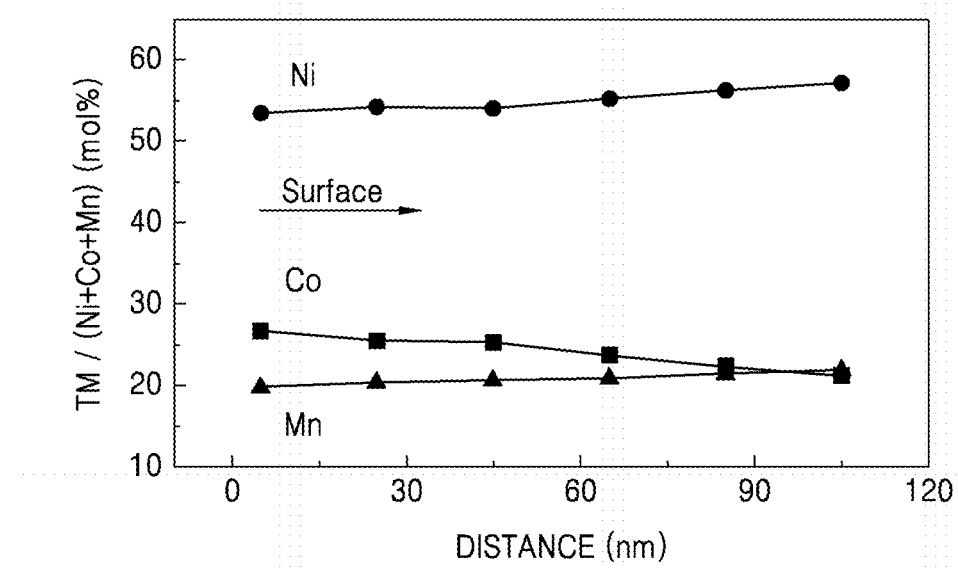
Figure 6A:
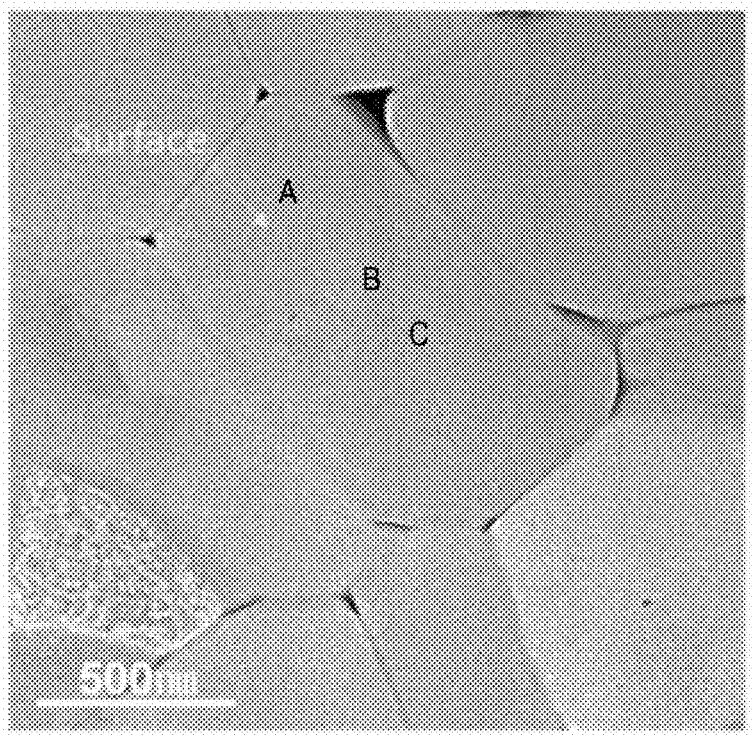
FIGS. 6A and 6B illustrate an SEM/EDX analysis image of the active material prepared in Comparative Example 1.
Figure 6B:
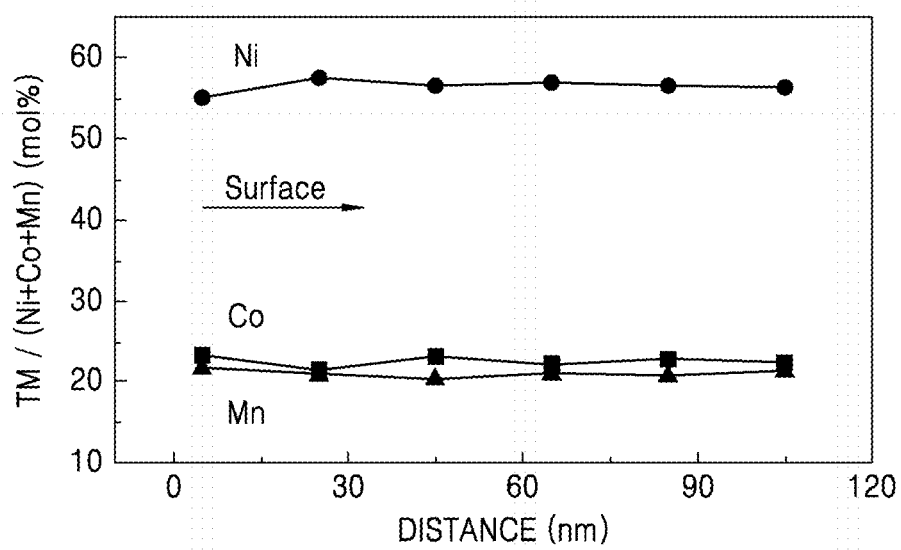

Atomic % of the transition metals of the composite cathode active material prepared in Example 1 shown in FIG. 5A and the NCM prepared in Comparative Example 1 shown in FIG. 6A were measured by EDX with respect to regions A, B, and C of the cross-sections of the primary particles, and the amounts of nickel, cobalt, and manganese in the coating layer at the three regions are respectively shown in a line profile of FIGS. 5B and 6B.

Referring to FIGS. 5A, 5B, 6A, and 6B, the primary particle of the composite cathode active material prepared in Example 1 had the highest cobalt concentration at the region A, and a continuous concentration gradient of which the cobalt concentration decreased from a surface of the primary particle to the center of the particle. The NCM prepared in Comparative Example 1 had approximately similar cobalt concentrations at the regions A, B, and C of the primary particle.

Evaluation Example 3

High Resolution-Transmission Electron Microscopy (HR-TEM) and Scanning Transmission Electron Microscopy (STEM) Analyses HR-TEM/STEM analyses were performed on the composite cathode active material prepared in Example 1 and the NCM prepared in Comparative Example 1 to evaluate crystallographic characteristics of the materials.

Figure 7A:
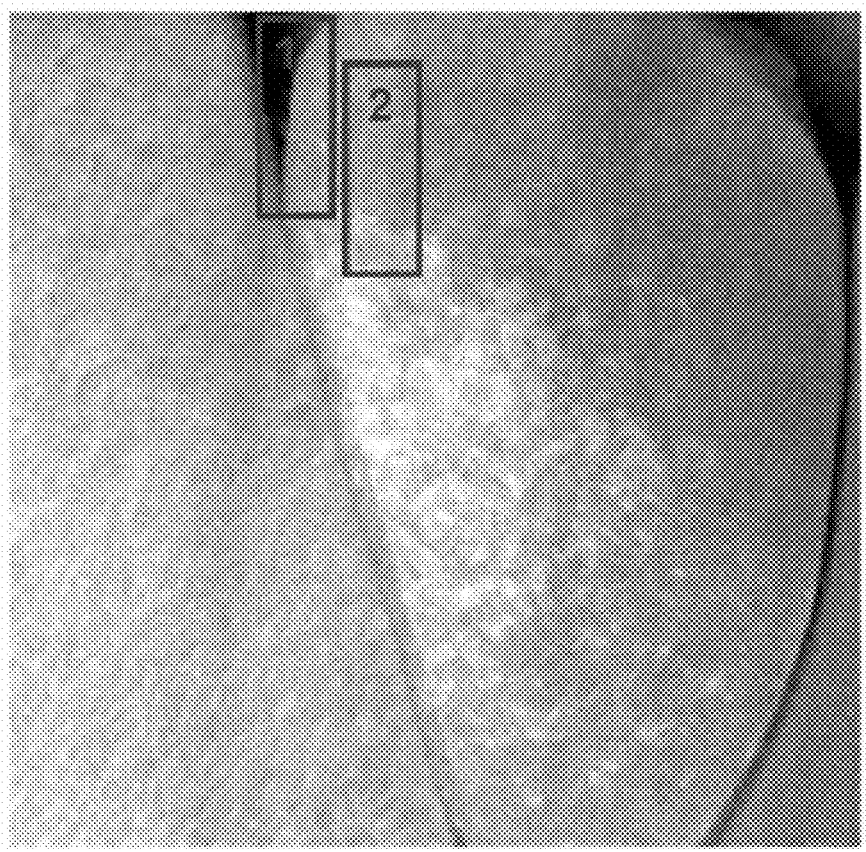
FIG. 7A illustrates an HR-TEM image of the primary particles in the composite cathode active material prepared in Example 1.
Figure 7B:
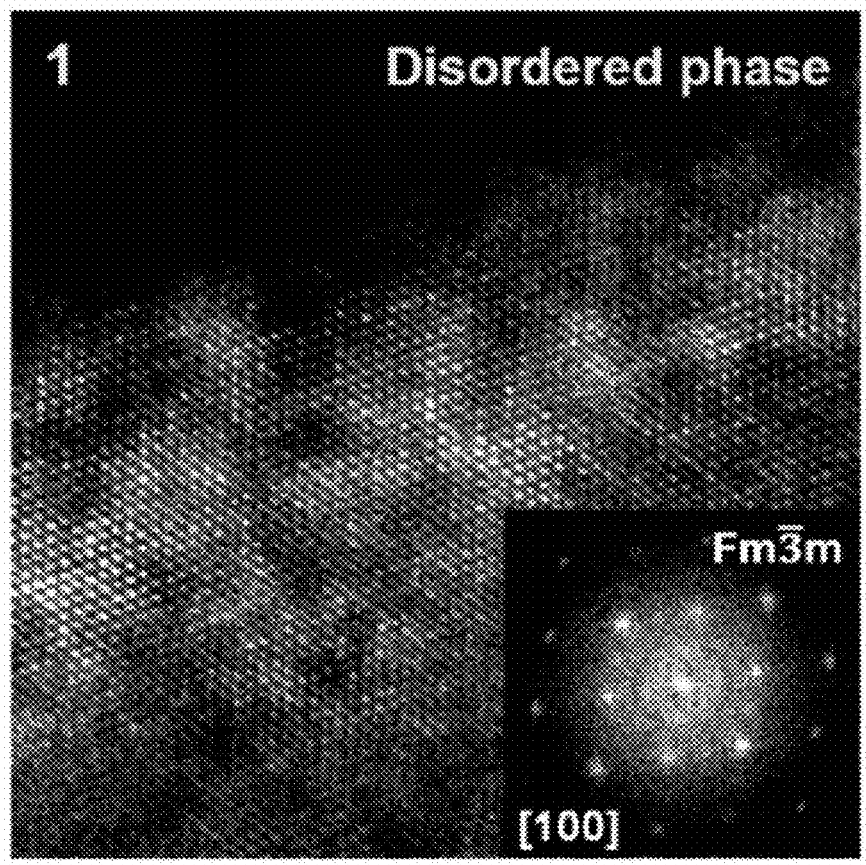
FIGS. 7B and 7C illustrate STEM images at point 1 and point 2 of the primary particles shown in FIG. 7A.
Figure 7C:
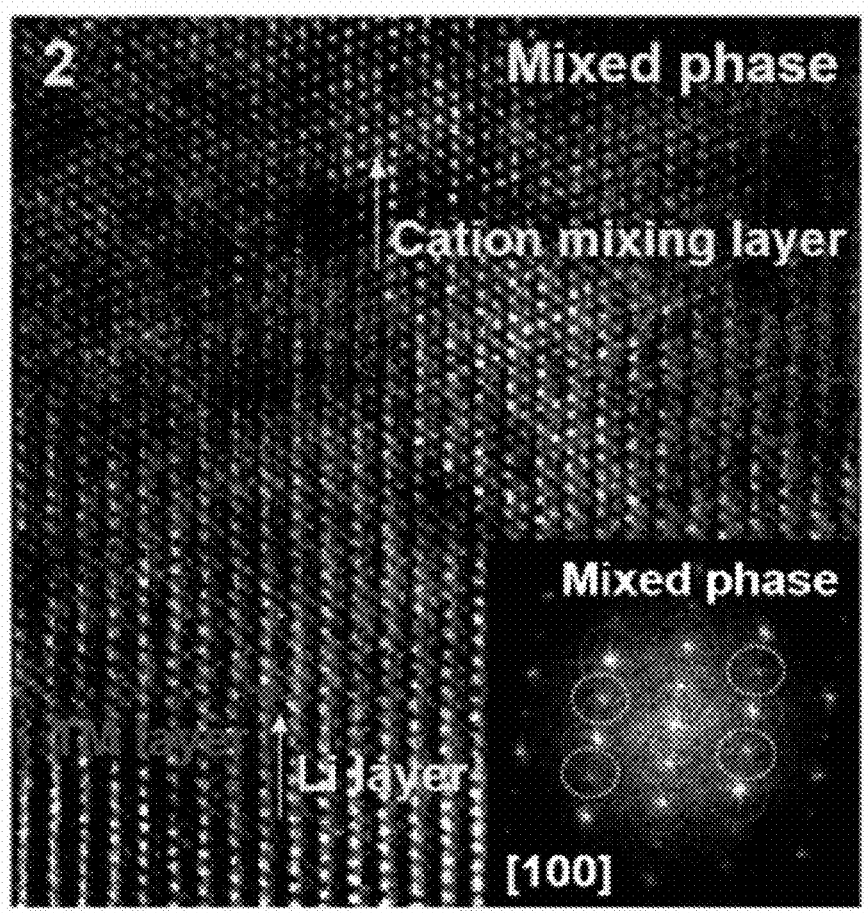
Figure 8A:
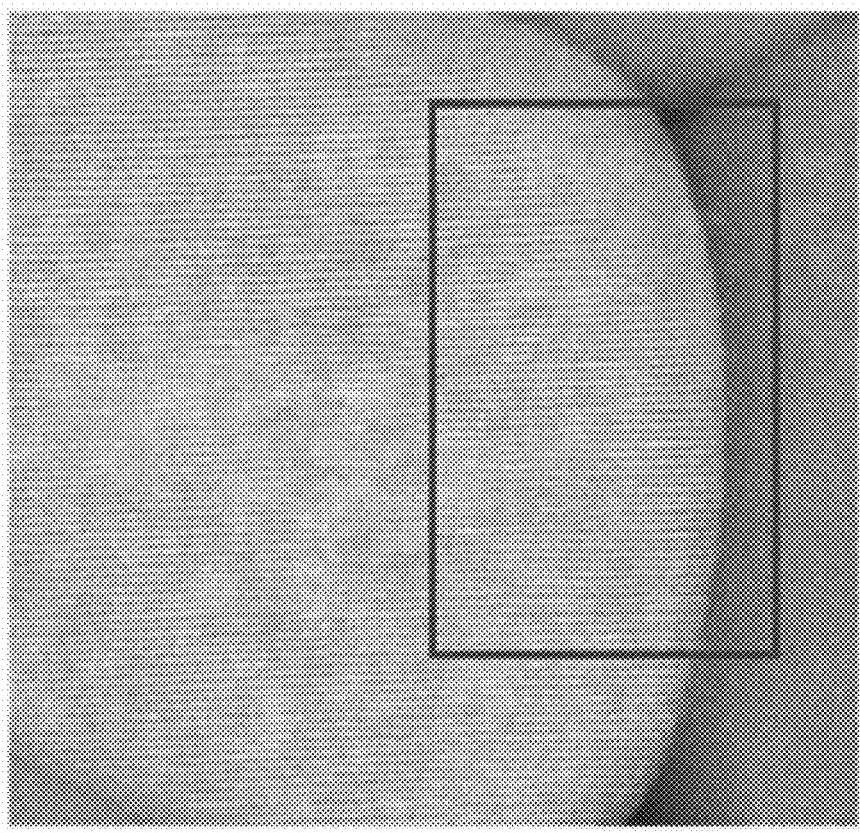
FIG. 8A illustrates an HR-TEM image of the active material obtained according to Comparative Example 1.
Figure 8B:
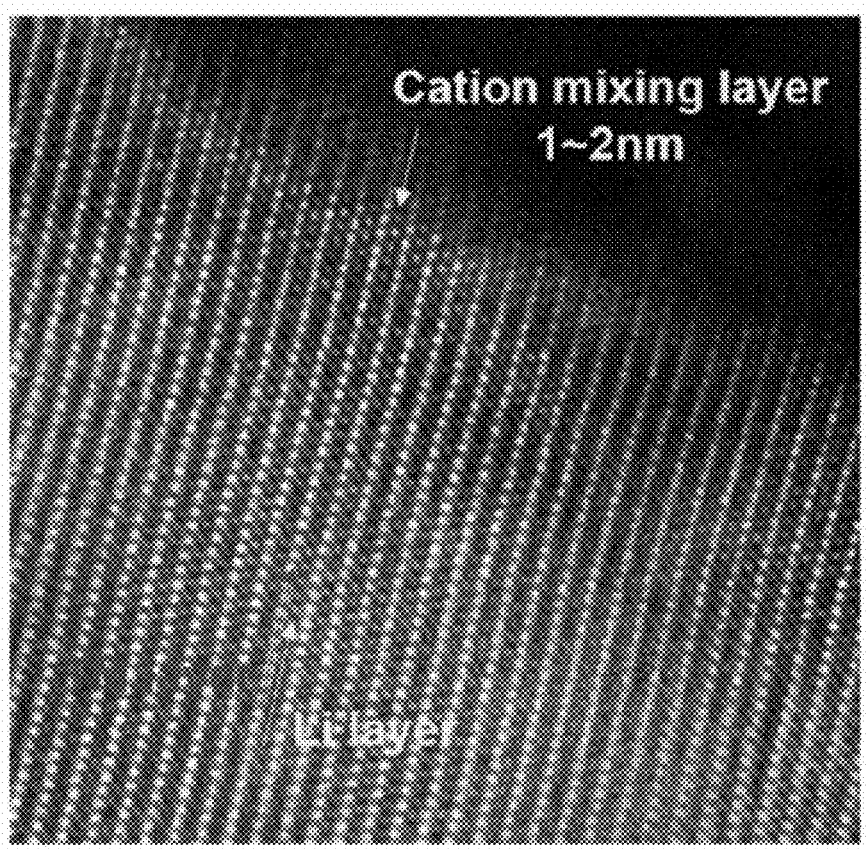
FIGS. 8B and 8C illustrate an STEM image of a region of the box in FIG. 8A.
Figure 8C:
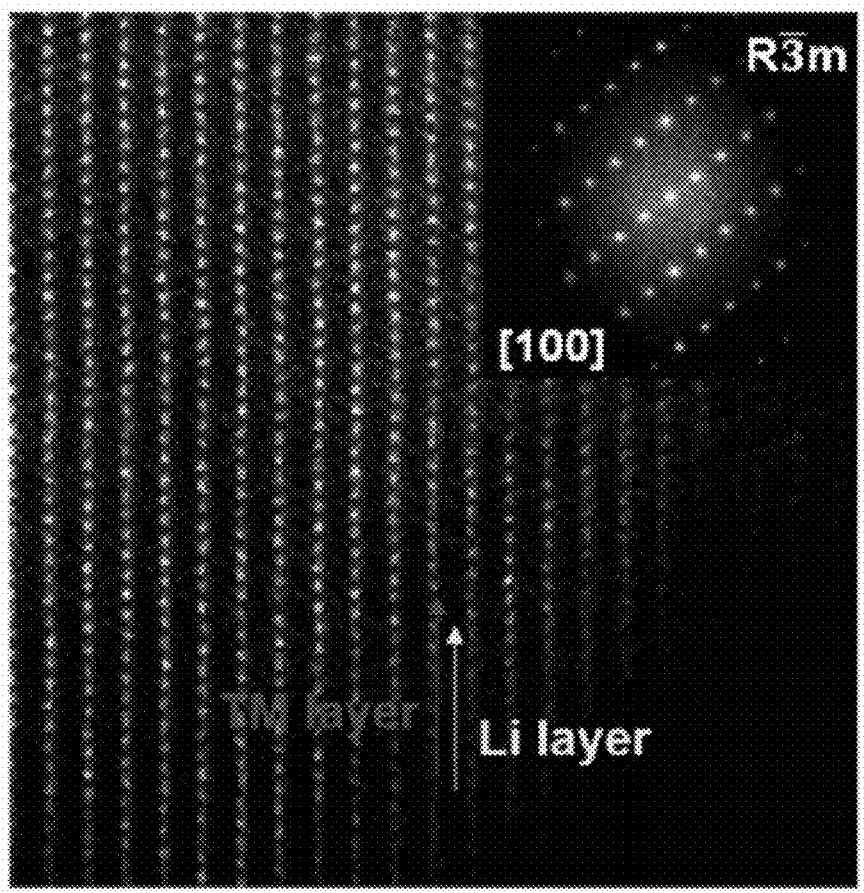

FIG. 7A illustrates an HR-TEM image of the primary particle in the composite cathode active material prepared in Example 1, and STEM images of the primary particle at region 1 and region 2 are respectively shown in FIGS. 7B and 7C. FIG. 8A illustrates an HR-TEM image of the NCM prepared in Comparative Example 1, and FIGS. 8B and 8C are STEM images of the box in FIG. 8A. In FIGS. 7 and 8, "TM layer" denotes the transition metal layer (a cobalt, manganese, and nickel layer), and "Li layer" denotes a lithium layer.

Referring to FIGS. 8A to 8C, an interior of the primary particle of the NCM prepared in Comparative Example 1 had a layered structure (a trigonal system, a space group Rm).

Referring to FIG. 7B, an exterior of the primary particle at region 1 had a structure having a disordered phase and that the crystal structure having a rock-salt structure (an isometric system, a space group Fmm). Region 2 was formed of a mixed phase. The coating layer formed on a surface of the primary particle may have a structure that does not have a boundary between the primary particle and the layer. A surface phase of the primary particle was a cation-mixing layer having a rock-salt phase. The phase was formed without a boundary of a comparative structure.

Evaluation Example 4

Differential Scanning Calorimeter (DSC) Analysis

Thermal stabilities of the composite cathode active material prepared in Example 1 and the NCM prepared in Comparative Example 1 were evaluated by performing analysis using a differential scanning calorimeter. The half-coin cells including the materials were charged until a voltage of 4.5 V at a state of deintercalating lithium in the structure while increasing a temperature to evaluate thermal stabilities of the materials.

Figure 9:
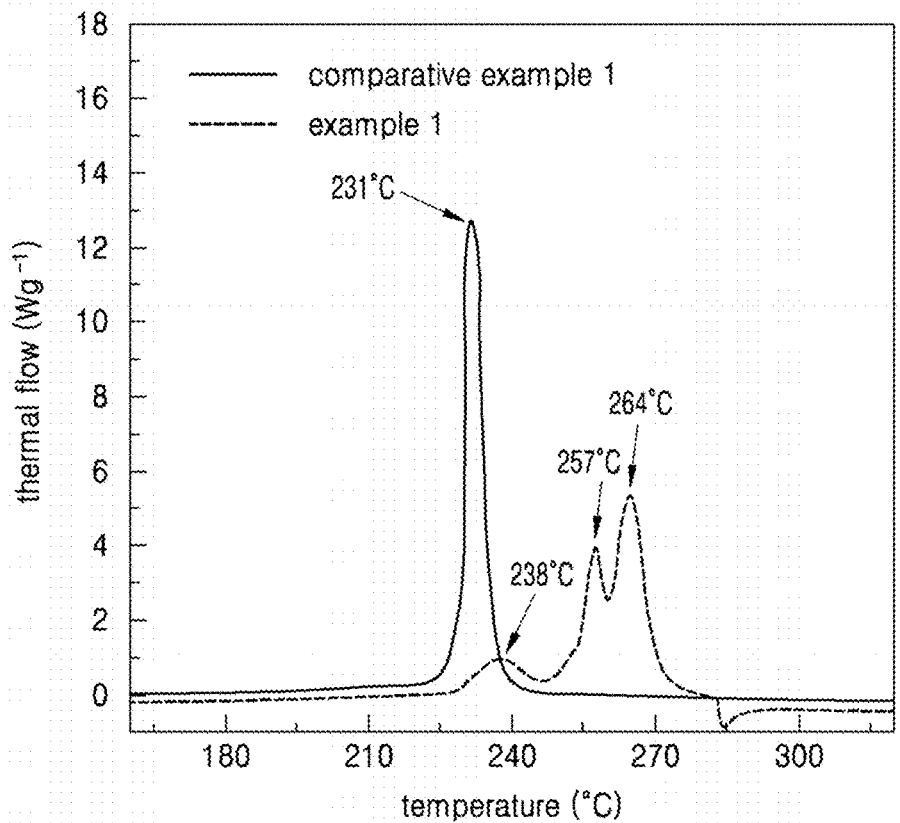
FIG. 9 illustrates the results of analysis of the composite cathode active material prepared in Example 1 and the NCM obtained according to Comparative Example 1 using a differential scanning calorimeter.

The evaluation results of the thermal stabilities are shown in FIG. 9.

Referring to FIG. 9, the composite cathode active material prepared in Example 1 had an onset temperature that was pushed back after surface-treatment of the primary particle (Example 1), and a caloritic value of the primary particle was reduced from about 910 J/g (Comparative Example 1) to about 630 J/g.

The composite cathode active material prepared in Example 1 was excellent in terms of thermal stability, compared to that of the NCM prepared in Comparative Example 1.

Evaluation Example 5

Half-Cell Charging/Discharging Characteristics

The coin half-cells prepared in Manufacture Example 1 and Comparative Manufacture Example 1 were constant-voltage charged with a constant current of about 0.1 C rate at a temperature of 25° C., until a voltage was 4.45 V (vs. Li). Subsequently, the cells were discharged with a constant current of 0.1 C until a voltage was 3.0 V (vs. Li) (as the $1^{st}$ cycle). The charging/discharging cycle was repeated once.

Figure 10:
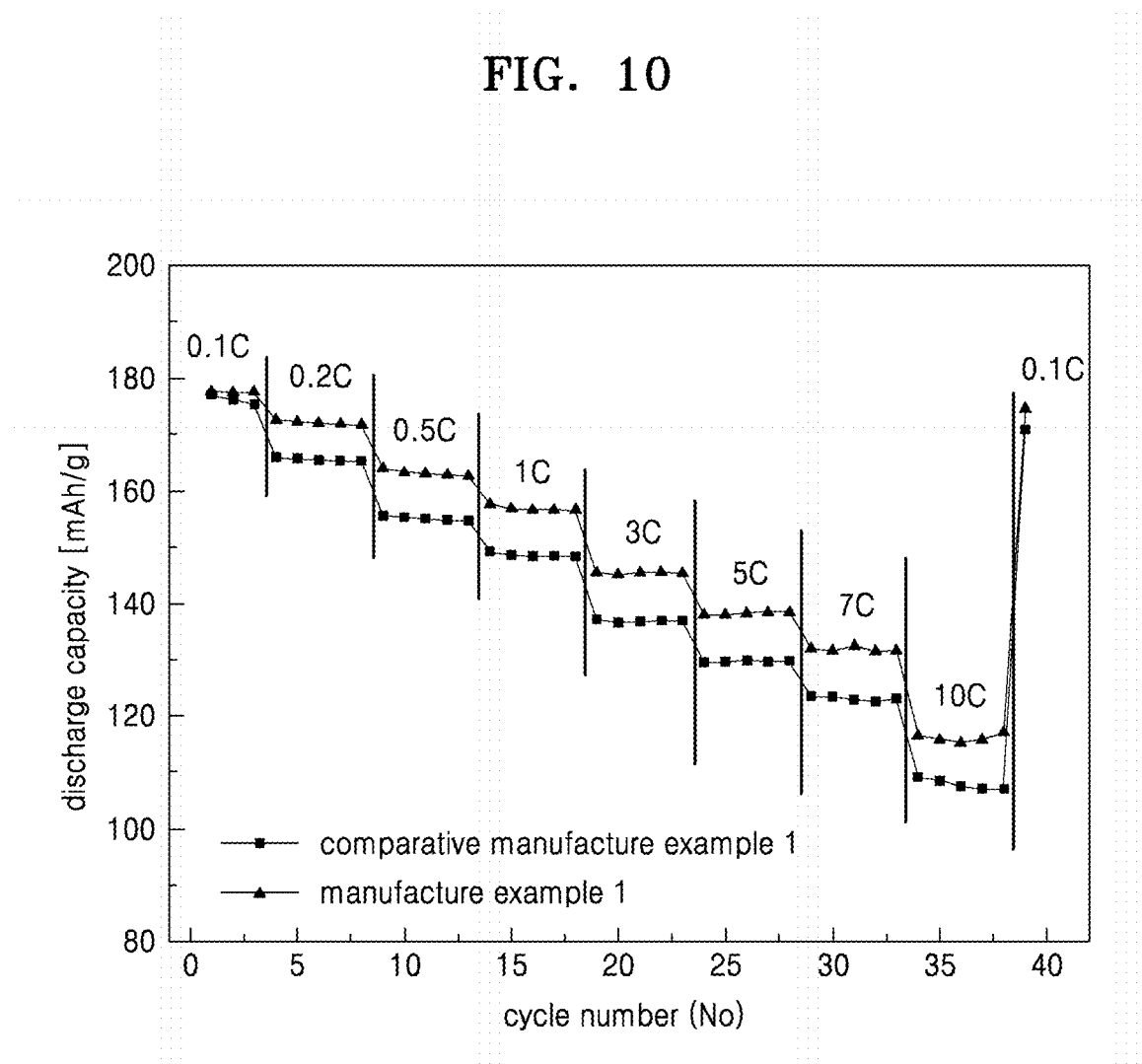
FIG. 10 illustrates a graph showing high rate charging/discharging characteristics of coin half-cells prepared in Preparation Example 1 and Comparative Preparation Example 1.

Then, the lithium battery was constant-voltage charged under the same conditions as in the first cycle shown in FIG. 10, and the discharging process was performed at a constant rate of 0.2 C, 0.5 C, 1 C, 3 C, 5 C, 7 C, or 10 C, instead of a constant current of 0.1 C.

The charging/discharging efficiency and high rate characteristics obtained by the charging/discharging test are defined as in Equation 1.

High rate characteristics [%]=[1C ($2^{nd}$ cycle) discharge capacity/0.1C ($1^{st}$ cycle) discharge capacity]×100     <Equation 1>

As shown in FIG. 10, the lithium battery prepared in Manufacture Example 1 had better high rate characteristics, compared to those of the lithium battery prepared in Comparative Manufacture Example 1.

Evaluation Example 6

Half Cell High Temperature Lifespan Characteristics Test

Lithium batteries prepared after the heat treatment were charged at a constant current of 0.5 C rate until a voltage reached about 4.3 V (vs. Li), and constant-voltage charge was performed until a current reached about 0.5 C while the voltage was maintained at about 4.3 V. Subsequently, a constant-current discharge was performed at about 0.5 C until the voltage reached about 2.8 V (vs. Li) during the discharge for one cycle, and the cycle was performed 100 times.

Figure 11:
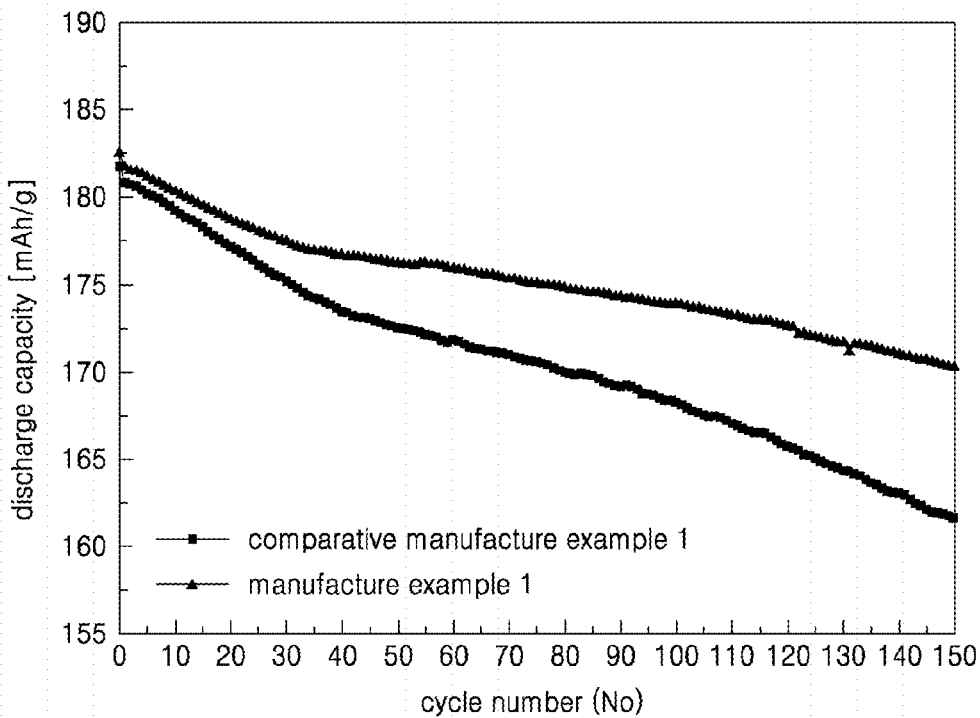
FIG. 11 illustrates a graph showing high temperature lifespan characteristics of the coin half-cells prepared in Preparation Example 1 and Comparative Preparation Example 1.

The results are shown in FIG. 11.

As shown in FIG. 11, the lithium battery of Manufacture Example 1 had improved lifespan characteristics, compared to those of the lithium battery prepared in Comparative Manufacture Example 1.

By way of summation and review, various cathode active materials may be used in the manufacture of suitable lithium batteries. A nickel-based lithium transition metal oxide may provide a discharge capacity per unit weight that is higher than a discharge capacity of a comparative $LiCoO_2$, but due to, for example, a low charge density of the nickel-based lithium transition metal oxide, the capacity per unit volume of the nickel-based lithium transition metal oxide may be low. Therefore, a lithium battery having low discharge capacity may be provided. The stability of the nickel-based lithium transition metal oxide may deteriorate, and a method of improving a charging/discharging efficiency, high rate characteristics, and lifespan characteristics of a lithium battery by increasing the charge density and thermal stability of the nickel-based lithium transition metal oxide may be needed.

One or more exemplary embodiments may include a composite cathode active material and a method of preparing the composite cathode active material. One or more exemplary embodiments may include a cathode including the composite cathode active material. One or more exemplary embodiments may include a lithium battery including the cathode.

As described above, according to the one or more of the above embodiments, a lithium battery may include a composite cathode active material, and lifespan characteristics of the lithium battery may improve without a decrease in its capacity characteristics.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite cathode active material, comprising a nickel-based lithium transition metal oxide secondary particle, the nickel-based lithium transition metal oxide secondary particle including a coating layer containing lithium and cobalt on a surface of a primary particle of the secondary particle,
wherein a concentration of the cobalt has a concentration gradient that continuously decreases from the coating layer to a center of the primary particle wherein the nickel-based lithium transition metal oxide is a compound represented by Formula 1:

$Li_aNi_{1-x-y}Co_xM_yO_{2+\alpha}$ [Formula 1]

wherein, in Formula 1, 0.9<a<1.5, 0<x<0.5, 0<y<1, and −0.1 ≤α≤0.1; and
M is one or more of Mg, Ca, Sr, Ba, Ti, Zr, Nb, Mo, W, Zn, Al, Si, Mn, Cr, Fe, V, or a rare earth element, and wherein the coating layer includes a compound represented by Formula 2:

$Li_aNi_{1-y-z}Co_xM_yMn_zO_2$ [Formula 2]

wherein, in Formula 2, M is a transition metal; and 0.9<a<1.5, 0<x≤0.3, 0≤y≤0.1, 0<z≤0.3.

2. The composite cathode active material as claimed in claim 1, wherein an amount of cobalt included in the coating layer is greater than about 0 mol % to about 30 mol % or less based on a total amount of the cobalt and the other transition metal.

3. The composite cathode active material as claimed in claim 1, wherein a thickness of the coating layer is about 20 nm or less.

4. The composite cathode active material as claimed in claim 1, wherein the coating layer includes:
i) a product obtained by a sol-gel reaction of a composition including a lithium salt and a cobalt salt, or
ii) a nickel-based lithium transition metal oxide and a product obtained by a sol-gel reaction of a composition including a lithium salt and a cobalt salt.

5. The composite cathode active material as claimed in claim 4, wherein, in the coating layer, an amount of i) the product obtained by a sol-gel reaction of a composition including a lithium salt and a cobalt salt, or ii) the nickel-based lithium transition metal oxide and a product obtained by a sol-gel reaction of a composition including a lithium salt and a cobalt salt, is in a range of about 0.5 parts to about 3 parts by weight based on 100 parts by weight of the composite cathode active material.

6. A cathode, comprising the composite cathode active material as claimed in claim 1.

7. A lithium battery, comprising the cathode as claimed in claim 6.

8. The composite cathode active material as claimed in claim 1, wherein the primary particle of the secondary particle has an average particle diameter of about 200 nm to about 1 µM.

9. The composite cathode active material as claimed in claim 1, wherein:
an amount of cobalt included in the coating layer is 20 mol % to 28 mol %,
an amount of manganese included in the coating layer is 12 mol % to 20 mol %, and
an amount of nickel included in the coating layer 52 mol % to 60 mol %,
all mol % being based on a total amount of the cobalt and the other transition metal.

10. The composite cathode active material as claimed in claim 1, wherein an intermediate region having a mixed phase is formed between the primary particle and the coating layer.

11. The composite cathode active material as claimed in claim 1, wherein the primary particle has a crystalline structure of a layered structure (Fm3m), the coating layer has a compound having a crystalline structure of a rock-salt layered structure (R3m), and a mixed phase is between the primary particle and the coating layer.

12. A method of preparing the composite cathode active material as claimed in claim 1, the method comprising:
performing a sol-gel reaction of a nickel-based lithium transition metal oxide and a composition including a lithium salt and a cobalt salt; and
heat-treating a product of the sol-gel reaction in an oxidizing gas atmosphere at a temperature in a range of about 600° C. to about 900° C.

* * * * *